United States Patent
Brown, Jr. et al.

(10) Patent No.: US 10,946,298 B1
(45) Date of Patent: Mar. 16, 2021

(54) POSITIONING AND GUIDING MECHANISMS FOR APPENDAGES AND VEHICLE PLATFORM

(71) Applicant: Hasbro, Inc., Pawtucket, RI (US)

(72) Inventors: James Edward Brown, Jr., Pawtucket, RI (US); Spencer A Roberts, North Providence, RI (US); Melissa Hershey, Providence, RI (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 16/704,696

(22) Filed: Dec. 5, 2019

Related U.S. Application Data

(60) Provisional application No. 62/786,240, filed on Dec. 28, 2018.

(51) Int. Cl.
| | | |
|---|---|---|
| *A63H 30/04* | (2006.01) |
| *A63H 33/00* | (2006.01) |
| *A63H 33/26* | (2006.01) |
| *G05D 1/00* | (2006.01) |
| *B62D 61/00* | (2006.01) |
| *A63H 13/00* | (2006.01) |

(52) U.S. Cl.
CPC ........... *A63H 33/005* (2013.01); *A63H 13/00* (2013.01); *A63H 30/04* (2013.01); *A63H 33/26* (2013.01); *B62D 61/00* (2013.01); *G05D 1/0016* (2013.01); *G05D 2201/0214* (2013.01)

(58) Field of Classification Search
CPC ...... A63H 15/00; A63H 156/06; A63H 33/00; A63H 33/005; A63H 33/26; A63H 23/04; A63H 27/00; A63H 27/02; A63H 29/22; A01K 15/025; B62K 1/00; B62K 11/007

USPC ............... 446/409, 454, 465, 470; 180/21
See application file for complete search history.

(56) References Cited

U.S. PATENT DOCUMENTS

| | | | |
|---|---|---|---|
| 561,777 A | | 6/1896 | Essberger et al. |
| 4,057,929 A | * | 11/1977 | Ogawa ............... E05D 15/0621 |
| | | | 446/90 |
| 4,589,174 A | | 5/1986 | Allen |
| 4,601,675 A | | 7/1986 | Robinson |
| 5,533,921 A | | 7/1996 | Wilkinson |
| 5,676,582 A | | 10/1997 | Lin |
| 5,709,583 A | | 1/1998 | Suth et al. |
| 5,865,661 A | | 2/1999 | Cyrus et al. |
| 5,871,386 A | * | 2/1999 | Bart ...................... A63H 15/06 |
| | | | 446/443 |
| 5,984,757 A | | 11/1999 | Tsai |
| 6,056,619 A | | 5/2000 | Wiggs et al. |
| 6,779,621 B2 | | 8/2004 | Kamen et al. |

(Continued)

FOREIGN PATENT DOCUMENTS

CN        201220111 U     4/2009

*Primary Examiner* — Kien T Nguyen
(74) *Attorney, Agent, or Firm* — Perry Hoffman

(57) ABSTRACT

A vehicle platform with positioning and guiding mechanisms and having a single wheel. A frame extends from the vehicle with a receptacle connected to the frame, and a motor drives the vehicle forward and rearward. A head appendage is mounted to the receptacle to yaw left and right, pitch up and down, and roll from side to side to guide the vehicle. Another motor provides for positioning the appendage to roll, with an additional motor for positioning the head to pitch and yaw. A pair of left and right rims is disposed adjacent to the wheel for limiting lean of the vehicle platform, and a control system is incorporated.

20 Claims, 17 Drawing Sheets

(56) References Cited

U.S. PATENT DOCUMENTS

| | | |
|---|---|---|
| 6,824,441 B1 | 11/2004 | Wiggs et al. |
| 6,902,464 B1 * | 6/2005 | Lee .......................... A63H 5/00 446/409 |
| 7,798,050 B2 | 9/2010 | Sembtner |
| 8,269,447 B2 | 9/2012 | Smoot et al. |
| 8,443,920 B2 | 5/2013 | Gomi et al. |
| 9,090,214 B2 | 7/2015 | Bernstein et al. |
| 2011/0014848 A1 | 1/2011 | Law |
| 2014/0345957 A1 | 11/2014 | Bernstein et al. |
| 2015/0224941 A1 | 8/2015 | Bernstein et al. |

\* cited by examiner

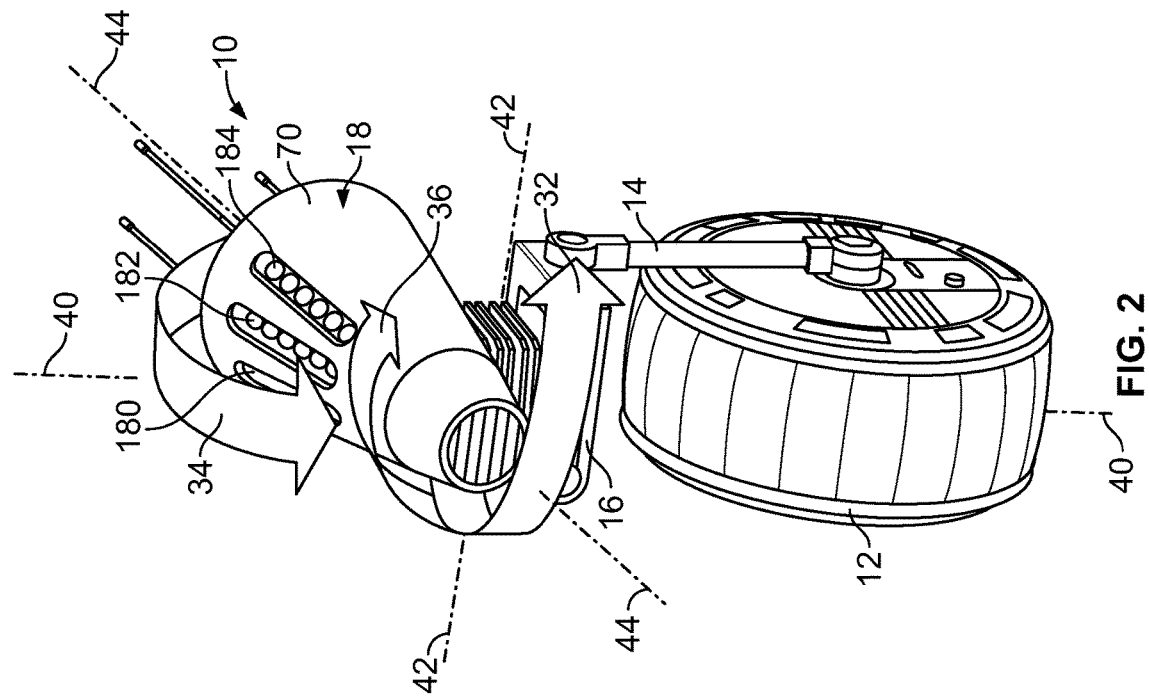
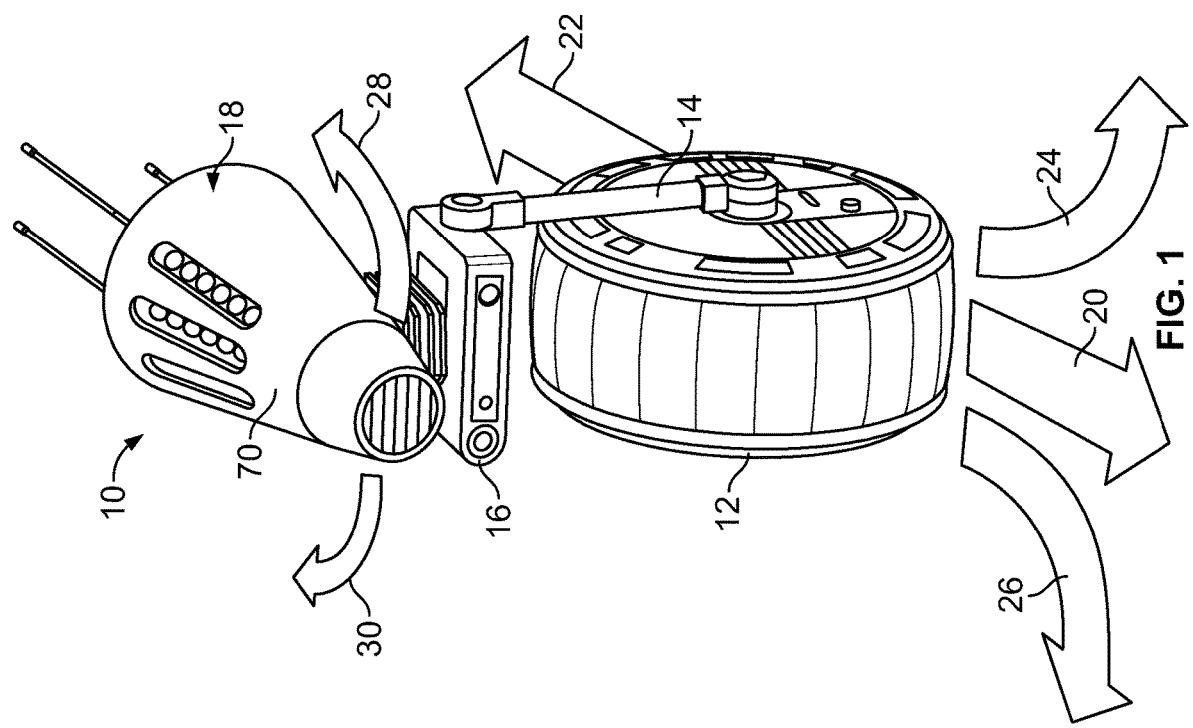

POSITIONING AND GUIDING MECHANISMS FOR APPENDAGES AND VEHICLE PLATFORM

PRIORITY CROSS-REFERENCE TO RELATED APPLICATION

This application claims priority pursuant to 35 U.S.C. 119(e) or 120 from U.S. Provisional Application No. 62/786,240, filed Dec. 28, 2018.

FIELD OF THE INVENTION

The present invention relates to a toy vehicle platform with positioning and guiding mechanisms having a single wheel, a frame, a receptacle mounted to the frame and a movable head unit. More particularly, the invention relates to a toy vehicle including a motor mounted in the wheel to drive the toy vehicle platform, another motor in the receptacle causes the head unit to roll and guide steering and still another motor mounted in the head unit. The motor in the head unit does emotive motions.

BACKGROUND OF THE INVENTION

Inverted pendulum vehicles are well known. For example, one early patent, U.S. Pat. No. 5,709,583, issued to Suto and Jaffe in 1998 and entitled "Steering System For Radio-Controller Wheeled Vehicle Toy", purports to disclose a motorcycle-like toy with a generally longitudinal vehicle body frame 11, a caster axle 14 mounted on a front end of the frame and tilted backward from a vertical, a front fork 15 rotatable on the caster axle and rotatably supporting a front wheel 12, a rear wheel drive 17 coupled to the rear wheel 13, a radio-control receiver 19, an electric power source mounted to the frame, and auxiliary wheels 53 mounted on opposite sides of the frame so as to be brought into contact with the ground when the vehicle body frame leans laterally. A steering system 16 is mounted in the front-end portion of the body frame. The steering system produces a control torque for rotating the front fork based on a control signal issued from the receiver, and a resilient mechanism 34 resiliently transmits the control torque to the front fork. There is only one motor, a drive motor 41.

Another earlier patent is U.S. Pat. No. 8,443,920, issued to Gomi and Takenaka in 2013 and entitled "Inverted Pendulum Type Vehicle", purports to disclose an inverted pendulum vehicle 1 that includes a frame 2, a drive unit 3, a seat unit 4, and electric unit 11 and a battery unit 10. The electric unit includes a control unit 5, a load sensor 6 and a tilt sensor 7. The vehicle is also provided with strain sensors 8L and 8R and rotary encoders 9L and 9R. The drive unit 3 includes a pair of drive assemblies 84L, 84R, and a pair of electric motors 82L, 82R for driving a main wheel 85. The vehicle 1 is able to perform turning movements without any additional devices by having a rider shift his/her gravitational center in a lateral direction. This tilts the vehicle in the lateral direction causing the drive wheel to turn.

Yet another U.S. Pat. No. 6,779,621, issued to Kamen, Field and Morrell in 2004 and entitled "Riderless Stabilization Of A Balancing Transporter" purports to disclose a human transporter 10, the transporter having a pair of wheels 20, 21, a platform 12 on which a human 8 may stand, a stalk 16, a handlebar 14, control thumbwheels 32, 34 and a ground-contacting module 26. The wheels are driven by motors in such a way as to maintain, when the vehicle is not moving, the center of gravity above contact regions of the wheels with the ground. To achieve locomotion and balance there are motor drives for the left and right wheels. The control system has data inputs including a user interface, a pitch sensor for sensing fore-aft pitch, wheel rotation sensors, and a pitch rate sensor. Pitch rate and pitch may be derived through the use of gyroscopes or inclinometers, for example, alone or in combination.

SUMMARY OF THE INVENTION

The present invention provides a toy interactive droid vehicle of great play value, the toy vehicle including a single wheel having a tire, a first motor connected to the single wheel for driving the wheel forward and rearward, a frame extending from the wheel, a receptacle connected to the frame, a head unit mounted to the receptacle to yaw left and right, pitch up and down, and to roll side to side to enable the head unit to steer the single wheel, a second motor to cause the head unit to roll, and a third motor to cause the head unit to pitch and yaw, while limiting lean thereof with left and right rims disposed adjacent to the tire.

Significantly, known apparatus/robotic toys and vehicles do not include mechanisms which position and precisely dispose appendages atop a self propelled vehicle platform for effectively positioning and guidance thereof, and the appendages constitute a head unit being mounted to yaw left and right, pitch up and down, and roll side to side to enable the head unit to steer the single wheel vehicle.

Briefly summarized, the present inventions relate to a vehicle platform with positioning and guiding mechanisms for a single wheel vehicle, which may have a tire. A first motor is connected to the vehicle for driving the wheel forward and rearward. A frame extends from the vehicle, with a receptacle connected to the frame. A novel appendage is mounted to the receptacle to yaw left and right, to pitch up and down, and to roll from side to side to guide the vehicle. A second motor is connected to the vehicle for positioning the appendage to roll, and a third motor is connected to the vehicle for positioning the head unit to pitch and yaw. A pair of left and right rims are disposed adjacent to the wheel for limiting lean of the vehicle platform, and a control system controls the first, second and third motors.

The present invention also includes a method for assembling a toy vehicle with positioning and guiding mechanisms including providing a single wheel vehicle, mounting a first motor to the vehicle for driving the wheel forward and rearward, mounting a frame extending from the wheel, connecting a receptacle to the frame, mounting an appendage to the receptacle to yaw left and right, pitch up and down, and roll side to side to guide the vehicle, mounting a second motor to the vehicle to cause the appendage to roll for steering and lateral stability, mounting a third motor to the vehicle for causing the appendage to pitch and yaw, and mounting a control system to the vehicle.

BRIEF DESCRIPTION OF THE DRAWINGS

For the purpose of facilitating an understanding of the invention, the accompanying drawings and detailed description illustrate a preferred embodiment thereof, from which the invention, its structures, its construction and operation, its processes, and many related advantages may be readily understood and appreciated.

FIG. 1 is an isometric view of a toy vehicle platform of the present invention and illustrates various movements that may be made by a wheel and head unit.

FIG. 2 is an isometric view of the toy vehicle shown in FIG. 1, illustrating roll, yaw and pitch movements of the head unit.

DESCRIPTION OF THE PREFERRED EMBODIMENT

Figure 4:
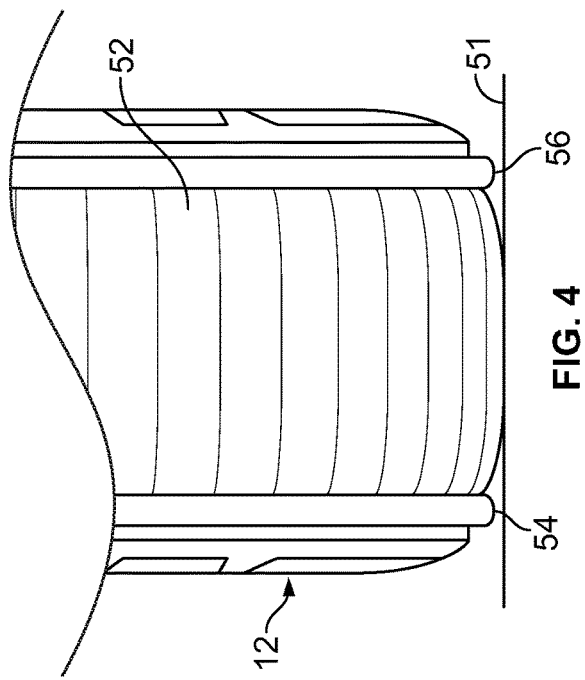
FIG. 4 is an enlarged partial front elevation view of a wheel tire and adjacent wheel rims of the toy vehicle shown in FIGS. 1-3.

The following description is provided to enable those skilled in the art to make and use the described embodiment set forth in the best mode contemplated for carrying out the invention. Various modifications, equivalents, variations, and alternatives, however, will become readily apparent to those skilled in the art. Any and all such modifications, variations, equivalents, and alternatives are intended to fall within the spirit and scope of the present invention.

The toy interactive droid vehicle of the present invention mimics the construction of a freestanding inverted pendulum. An inverted pendulum mechanism is inherently unstable and a feedback system may be used to prevent the mechanism from falling. Referring to FIGS. 1 and 2, there is illustrated an embodiment of the present invention in the form of a self balancing toy vehicle platform 10 which includes a wheel 12, a frame 14, a receptacle 16 with a bellows 17, FIG. 3, and an appendage or head unit 18 mounted via the bellows 17 to the receptacle 16. The head unit 18 is used to steer the toy vehicle. As shown in FIG. 1, the toy vehicle 10 may move forward and rearward as well as to the left and right as shown, respectively, by arrows 20, 22, 24, 26. The head unit is able to yaw around a vertical or normal axis by turning clockwise and counter clockwise as indicted by arrows 28, 30. Yaw movements of the head unit 18 are used here primarily for emotive reasons, and are also indicated by arrows 28, 30 FIG. 1, and arrow 32, FIG. 2.

The left and right movements of the toy vehicle 10 result from rolling the head unit 18 as indicated by an arrow 36 (as well as by rolling the head unit in the direction opposite the arrow 36). The head unit is mounted to the stand 16 to also allow yaw movements left and right as indicated by an arrow 32, FIG. 2 (as well as allowing yaw movements in the direction opposite to the arrow 32), and to allow the head unit to pitch up and down as indicated by an arrow 34 (as well as pitching in the direction opposite the arrow 34). The head unit 18 yaws around a normal axis 40, pitches up and down around a lateral axis 42 and rolls left and right around a longitudinal axis 44. The roll movements control steering and when the toy vehicle is in a docking base (see FIG. 24) the roll movement simulates emotion, and the pitch and yaw movements may also be used for emoting.

Figure 23:
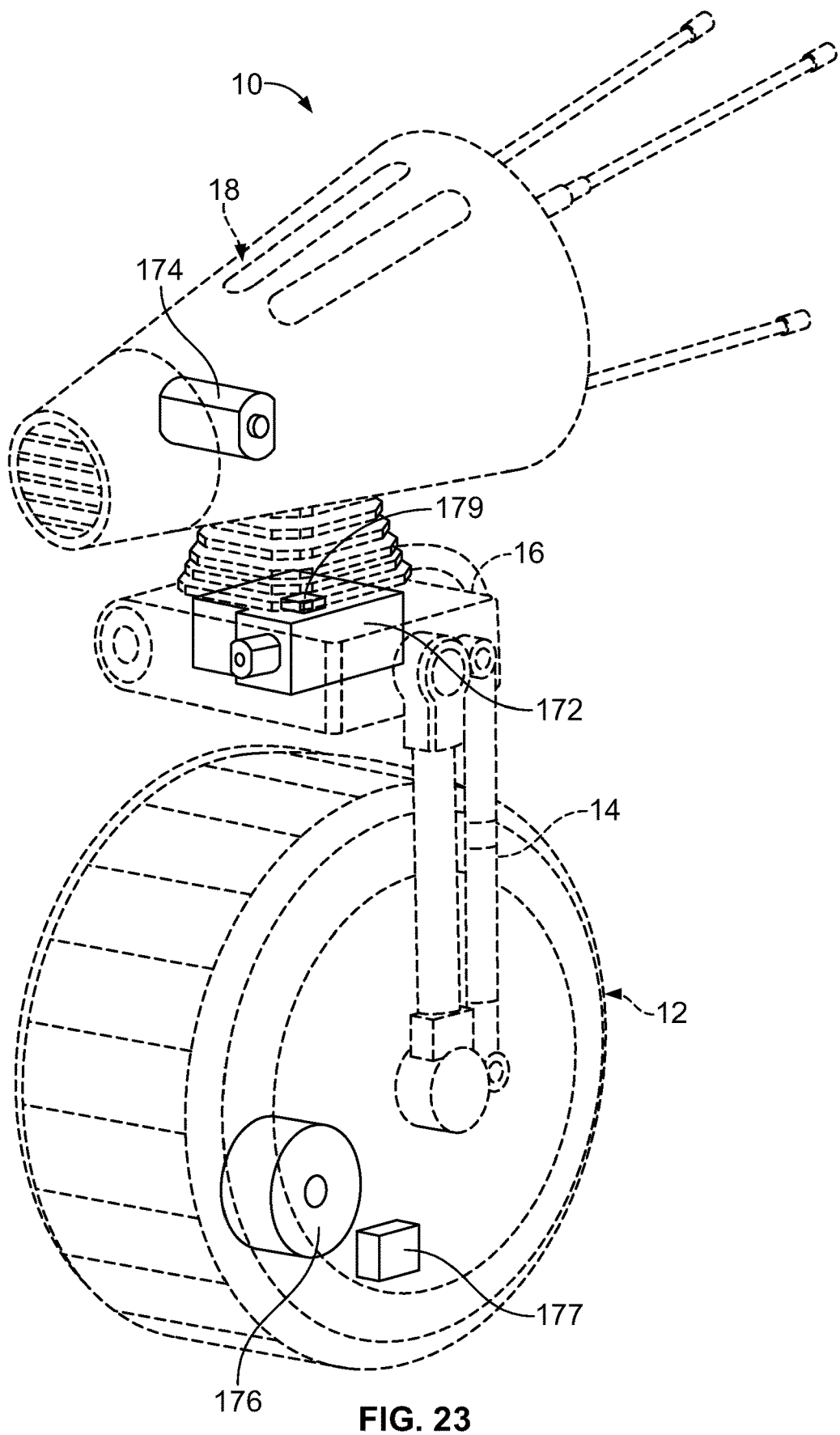
FIG. 23 is an enlarged isometric view of the toy vehicle illustrating placement of three motors and a control system.

The self balancing toy vehicle 10 remains upright by constantly driving the wheel 12 beneath a center of gravity (CG) of the head unit 18 with a first or drive motor 176, FIG. 23, which may be located in the wheel 12. A control system 177 that may also be located in the wheel 12 utilizes a nine-axis inertial measurement unit (IMU) and proportional-integral-derivative (PID) control loop to keep the head unit upright. In order to move the toy vehicle forward, a target angle of the head unit (in the PID control algorithm) is shifted from a vertical reference to a few degrees forward of the vertical. This allows the CG to shift forward and causes the toy vehicle to move forward. For the toy vehicle to right itself after moving forward, the target angle is returned to zero and the drive motor accelerates to generate a torque and return the head unit to the vertical.

Figure 5:
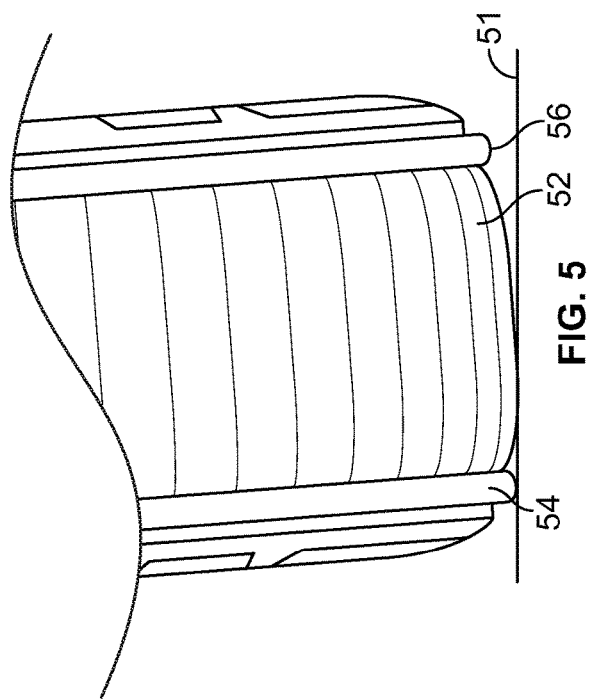
FIG. 5 is a front elevation view of the wheel tire and rims shown in FIG. 4, with a lateral lean so that both the wheel tire and one of the rims support the toy vehicle.
Figure 3:
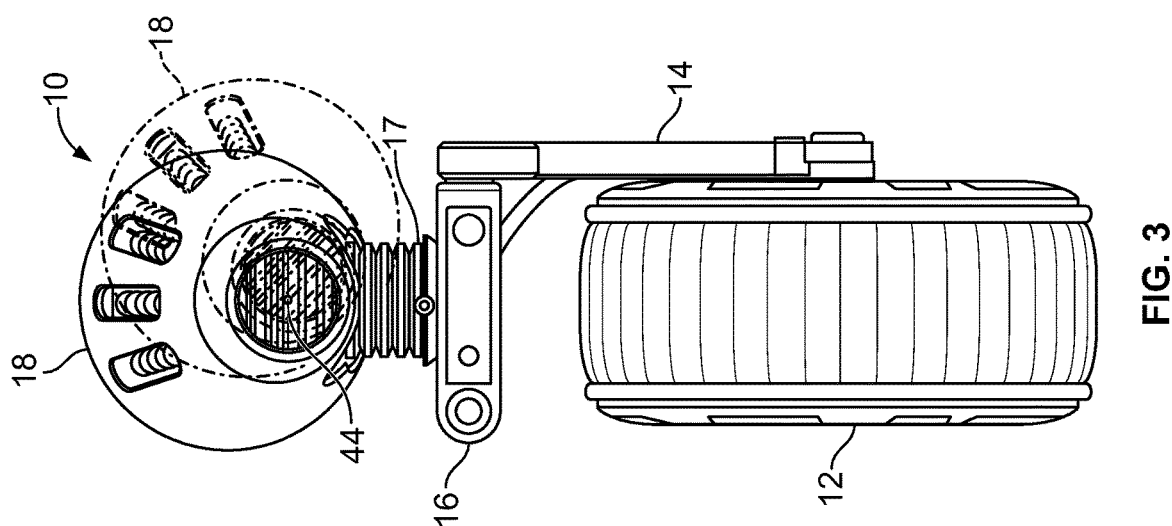
FIG. 3 is a front elevation view of the toy vehicle shown in FIGS. 1 and 2, and illustrating a leftward roll movement of the head unit.

As mentioned, steering of the toy vehicle 10 may be achieved by positioning the head unit 18 to roll left and right as indicated in FIG. 3. Rolling the head unit to one side causes the toy vehicle to lean such that the toy vehicle goes from support on a surface 51 by the wheel 12, which may have a circumferential tire 52, FIG. 4, to support of the toy vehicle by the wheel 12 and tire 52 and a left rim or rail 54 as shown in FIG. 5. The leaning wheel will still provide grip because of the tire and, in addition, the rim 54 will limit the lean of the wheel and also provide partial vehicle support. Because the diameter of the tire 52 around the wheel is larger than the diameter of the rim 54, the toy vehicle will move around in an arc. The larger the difference between the tire and the rim diameters, the tighter the turn of the toy vehicle will be. Referring to FIGS. 4 and 5, the operative radius is greatest when the wheel position is as shown in FIG. 4. As the vehicle leans, the relevant diameter is smaller and approaches that of the rim as shown in FIG. 5. The lean limit may be between 5° and 10°. One desired turning radius might be one to one and a half feet or 30 to 45 cm, so that the lean angle, and the tire and rim diameters will be arranged to provide this result. A right rim 56 is mounted to the wheel opposite the left rim 52 for a right turning radius. If the toy vehicle is about nine inches tall, the tire may be about four and a half inches in diameter and the rim 54 may be about ninety-eight percent of the tire diameter to achieve a desired turn radius.

Figure 7:
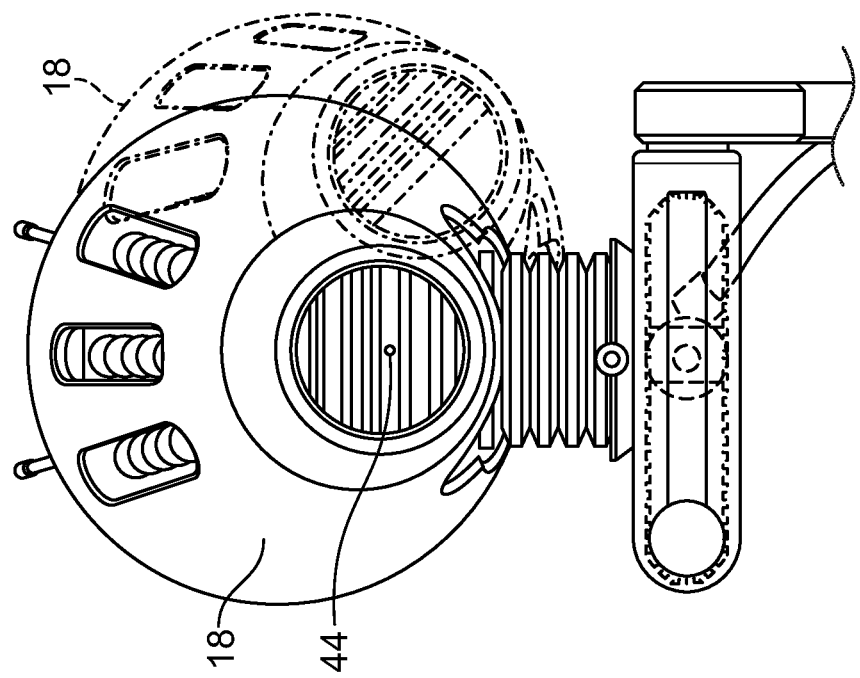
FIG. 7 is a front elevation view of the head unit of the toy vehicle shown in FIGS. 3 and 6, illustrating the lateral roll.
Figure 6:
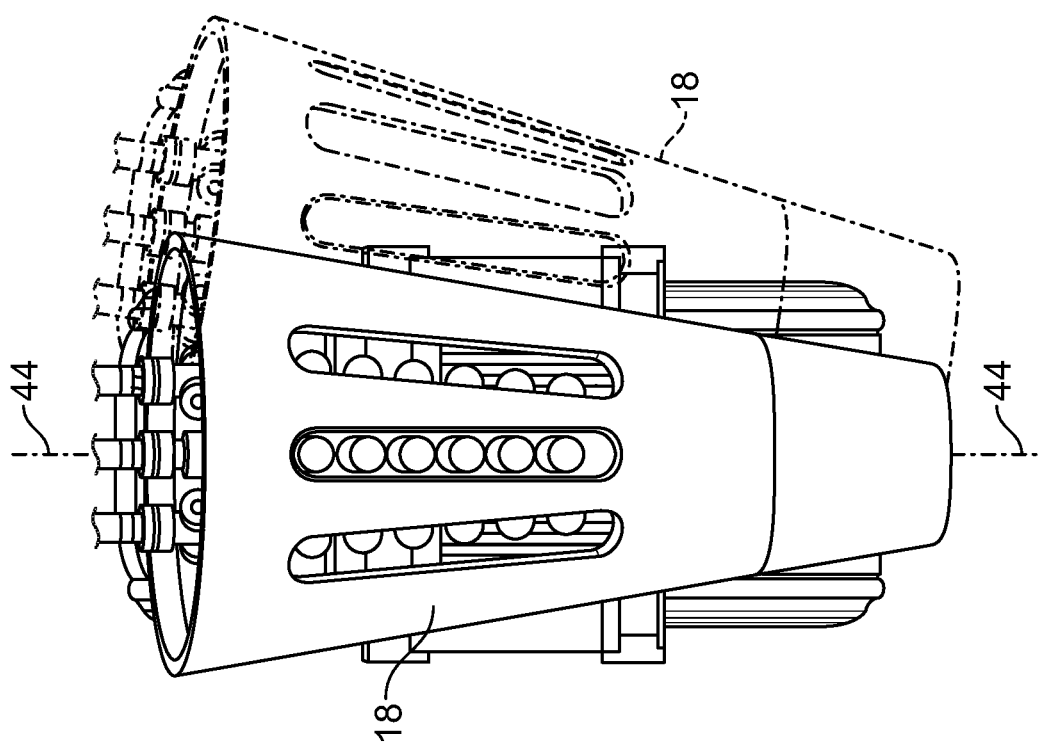
FIG. 6 is a top plan view of the head unit of the toy vehicle illustrating the lateral roll shown in FIG. 3.

To turn the toy vehicle 10, the head unit 18 rolls around the longitudinal axis 44 as is approximately shown in FIGS. 3, 6 and 7, where a top plan view of the head unit roll is illustrated in FIG. 6, and a front elevation view of the head unit roll is illustrated in FIG. 7. The roll of the head unit may be 30° to 45° left or right, to move the CG of the head unit over an edge of the wheel, and is controlled by a second, steering or roll motor 172, FIG. 23, located on the stand 16 to maintain quick control over the head unit and thereby steering of the toy vehicle. By using the drive and the roll motors, balance and steering is achieved to drive the toy vehicle in sweeping curves.

Figure 8:
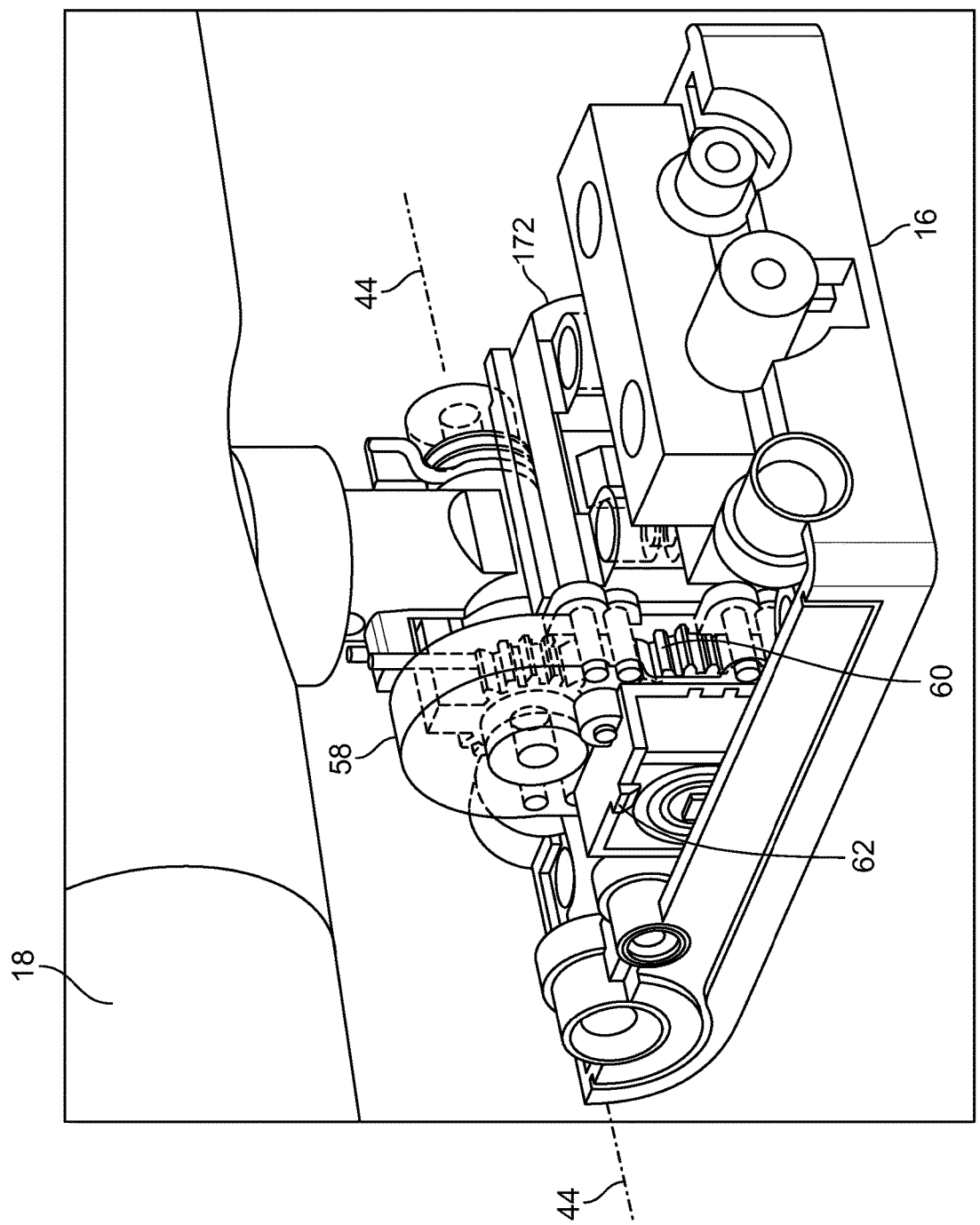
FIG. 8 is an isometric view of an uncovered receptacle of the toy vehicle shown in FIG. 1-3.

Referring now to FIG. 8, the receptacle 16 is shown in more detail. The receptacle is cantilevered from the top portion of the frame as shown and may, in the alternative, be a stand, a platform, a shelf, an overhang or the like. One mechanism to achieve roll of the head unit 18 around the roll axis 44, is the steering motor 172 with a gearbox 58, and an idler gearing 60 to raise the roll axis. A potentiometer 62 may be used for position recognition. An alternative preferred arrangement might use a servomotor.

Figure 9:
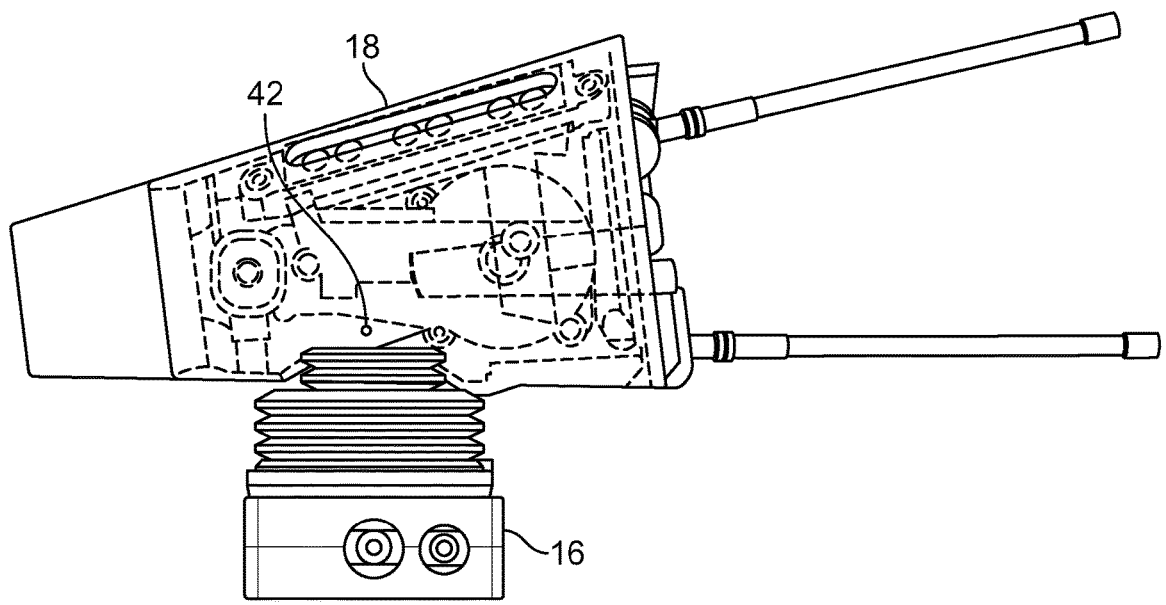
FIG. 9 is a side elevation view of the head unit and the receptacle of the toy vehicle illustrating a pitch axis for the head unit.
Figure 10:
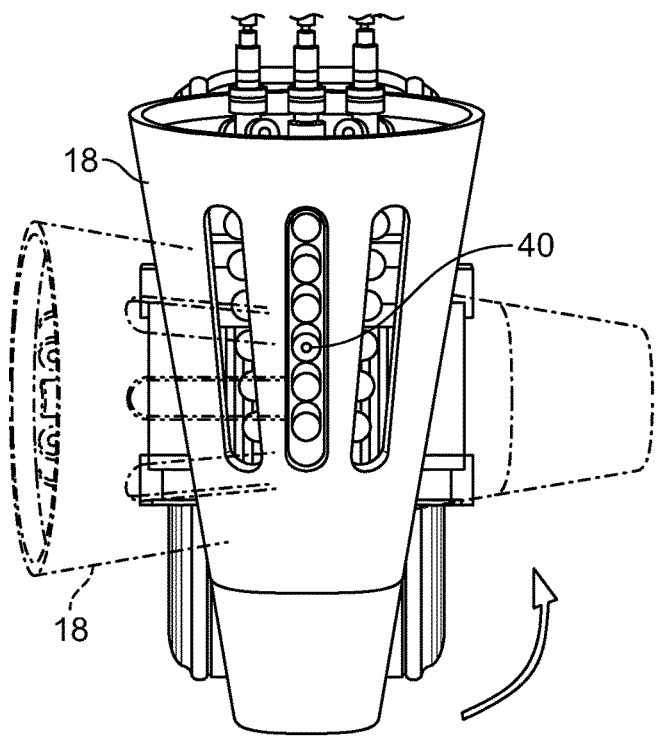
FIG. 10 is a top plan view of the head unit of the toy vehicle illustrating a counter clockwise yaw of 90°.
Figure 11:
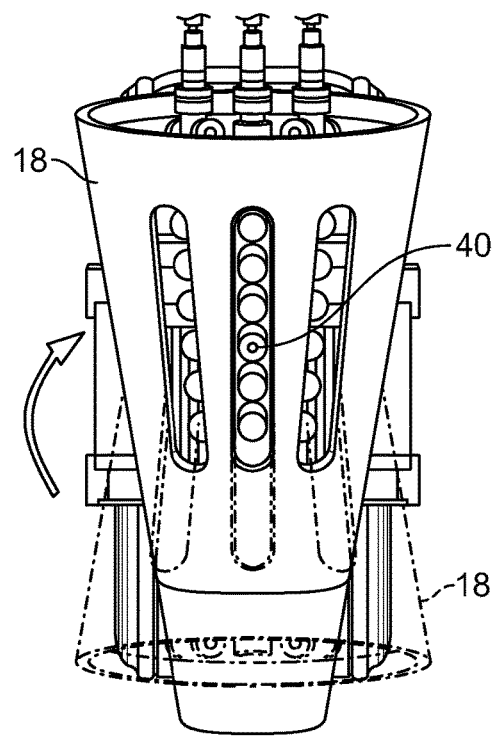
FIG. 11 is a top plan view of the head unit shown in FIG. 10, illustrating a clockwise yaw of 180°.

Referring now to FIG. 9, a third or pitch/yaw/antennas motor 174, FIG. 23, may be located in the head unit 18 to pitch the head unit up and down, for example, to pitch the head unit up 15° and down 20°, around the lateral axis 42. The same third motor 174 may also be used to move the head unit 18 around the normal axis 40, FIG. 10, in yaw, up to 90° to the left as illustrated in FIG. 10, and up to 180° to the right as illustrated in FIG. 11. The yaw movement may mainly be used to help give the toy vehicle emotional communication. The yaw movement may also cause the toy vehicle to turn in place when the head unit rotates quickly. The quick turn movement may be used to allow the toy vehicle to steer in place before driving away from a static position.

Figure 12:
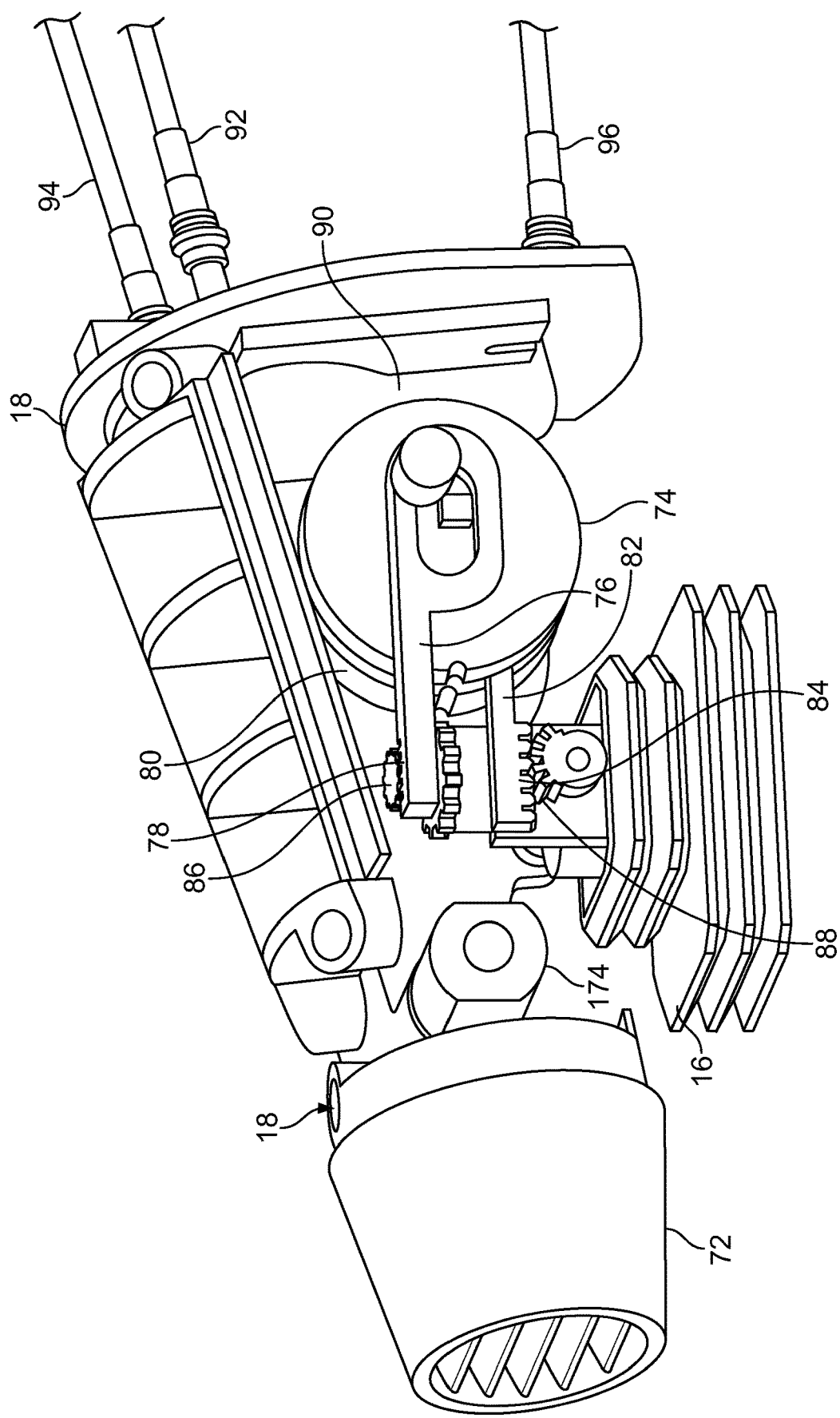
FIG. 12 is an isometric view of mechanisms in the head unit of the toy vehicle shown in FIGS. 1-3, illustrating the mechanisms for yaw, pitch and antennas movements.

Referring to FIG. 12, there is shown a mechanism that may be used to accomplish head unit pitch, yaw and antennas movements. The head unit 18 includes an outer housing or shell 70, FIGS. 1 and 2, which is mostly removed in FIG. 12. A nose housing 72, however, is illustrated, as is part of the bellows 17 and the pitch/yaw motor 174. The pitch/yaw motor is provided to drive a pair of cams, such as a rotatable yaw cam 74 that drives a yaw cam follower 76 having a distal end rack 78, and a rotatable pitch and antenna cam 80 that drives a pitch cam follower 82 having a distal end rack 84. The yaw cam follower rack 78 rotates a yaw gear 86 that in turn causes the head unit 18 to rotate left or right around the yaw axis 40, FIG. 2. The pitch cam follower rack 84, FIG. 12, rotates a pitch gear 88 which in turn causes the head unit 18 to rotate up and down around the lateral pitch axis 42. The pitch cam 80 may also move an antennas follower 90 that may cause antennas 92, 94, 96 to rotate.

Figure 13:
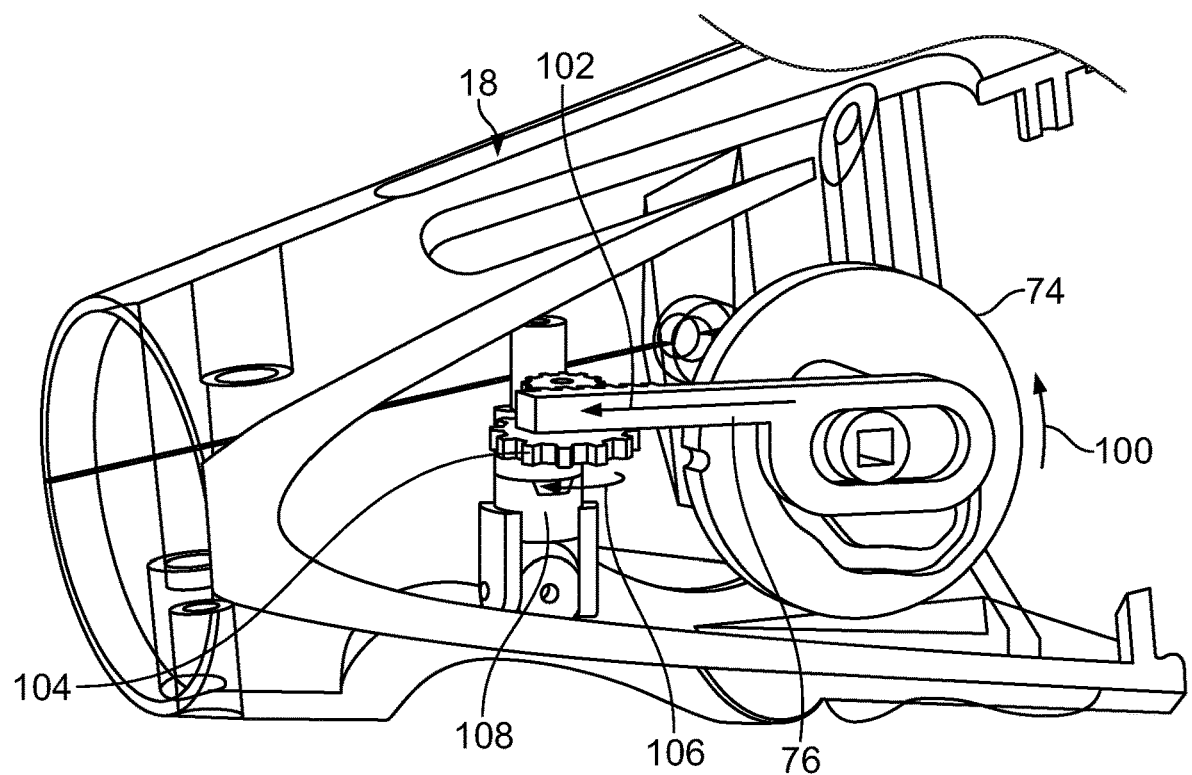
FIG. 13 is an isometric view of some mechanisms, including a cam, a cam follower and a gear, for the yaw movements of the head unit.

The yaw mechanism, including the cam 74 and the cam follower 76, is shown in more detail in FIG. 13. The pitch/yaw third motor 174 causes the yaw cam 74 to rotate, depicted by an arrow 100, and the yaw cam follower 76 to move to the left as depicted by arrow 102. This causes the yaw gear 104 to rotate, as depicted by an arrow 106, about a main head unit support 108. The cam 74, cam follower 76 and the yaw gear 104 may also move in opposite directions. The main support 108 is fixed relative to the stand 16 in the yaw direction, so that the head unit 18 is able to rotate left and right relative to the wheel 12. Continued rotation of the yaw cam causes the head unit to move to the right. Of course, the third motor 174 may move in reverse.

Figure 14:
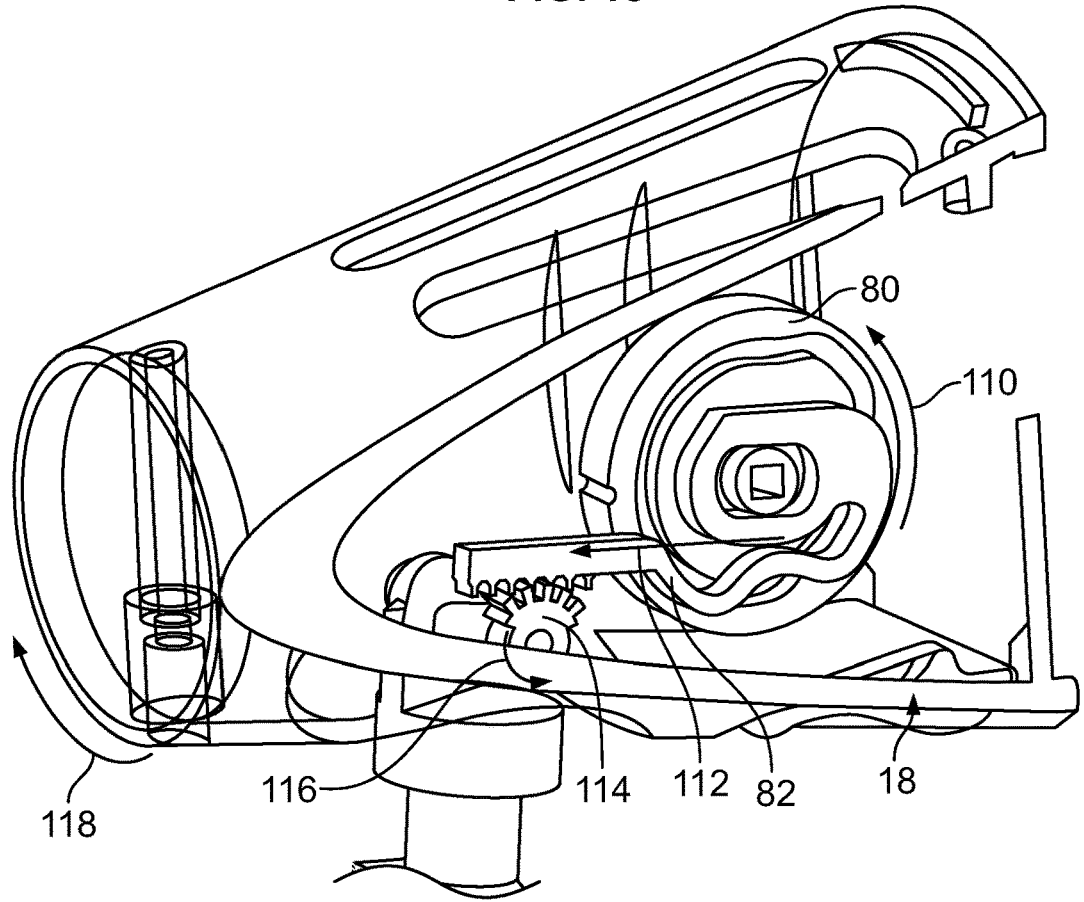
FIG. 14 is an isometric view of some mechanisms, including another cam, another cam follower and another gear, for the pitch movements of the head unit.
Figure 15:
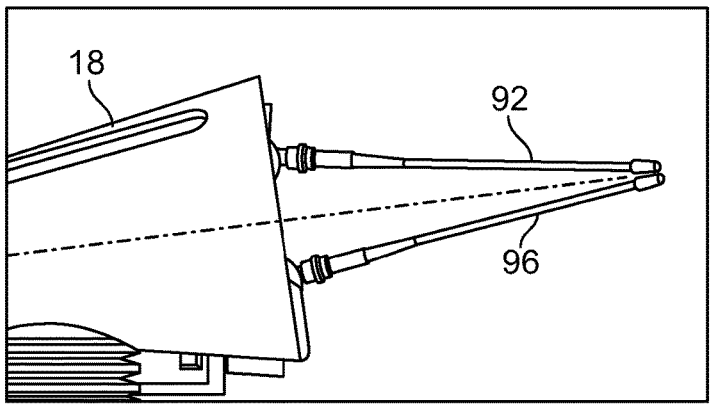
FIG. 15 is a side elevation view of a portion of the head unit and attached antennas illustrating the antennas in a pinched or converging configuration.
Figure 16:
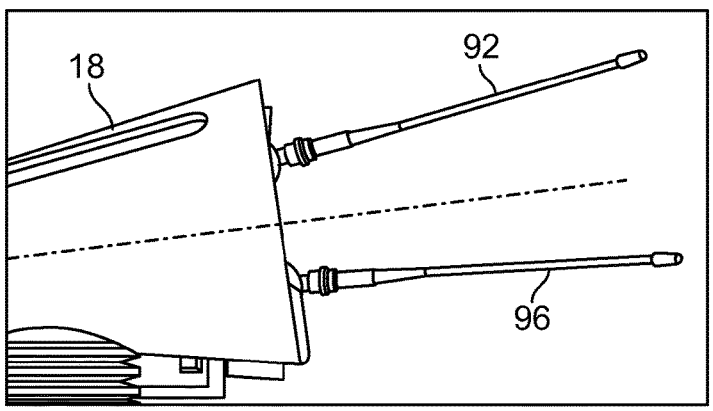
FIG. 16 is a side elevation view of the head unit and antennas shown in FIG. 15, illustrating the antennas in a neutral configuration.
Figure 17:
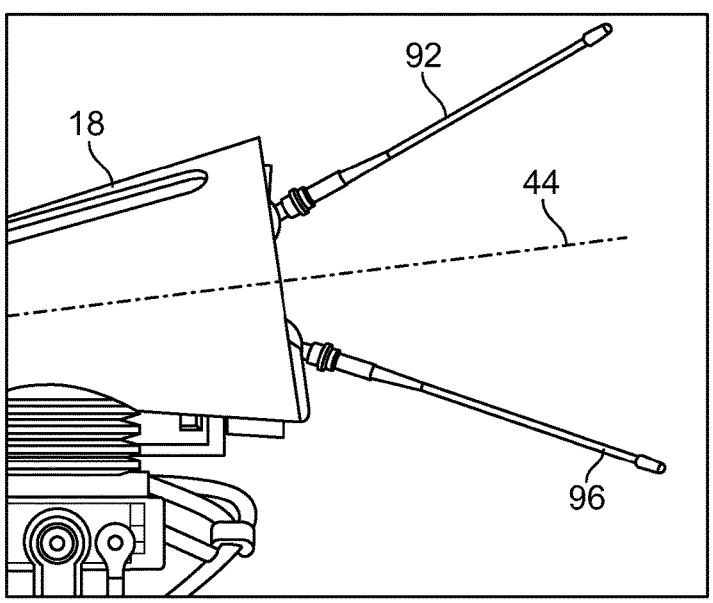
FIG. 17 is a side elevation view of the head unit and antennas shown in FIGS. 15 and 16, illustrating the antennas is a flared configuration.
Figure 18:
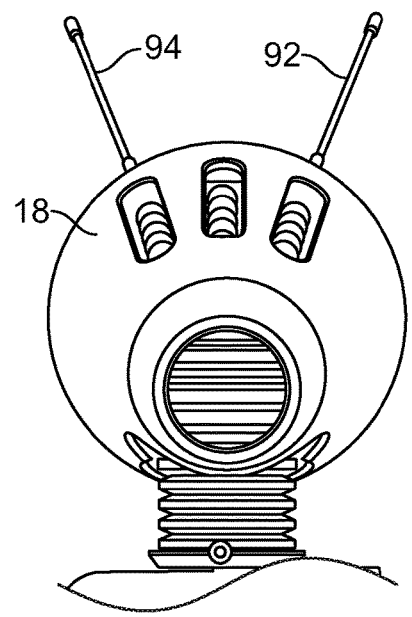
FIG. 18 is a front elevation view of the head unit illustrating the antennas in the flared configuration.

When the pitch/yaw motor 174 causes the pitch cam 80, FIG. 14, to rotate, depicted by an arrow 110, the pitch cam follower 82 moves to the left as depicted by an arrow 112 causing the pitch gear 114 to rotate, as depicted by an arrow 116, so that the head unit rotates upward relative to the wheel, as depicted by an arrow 118. Continued rotation of the pitch cam 80 causes the head unit 18 to pitch downward. Of course, the third motor 174 may also rotate the pitch cam in the opposite direction.

Figure 19:
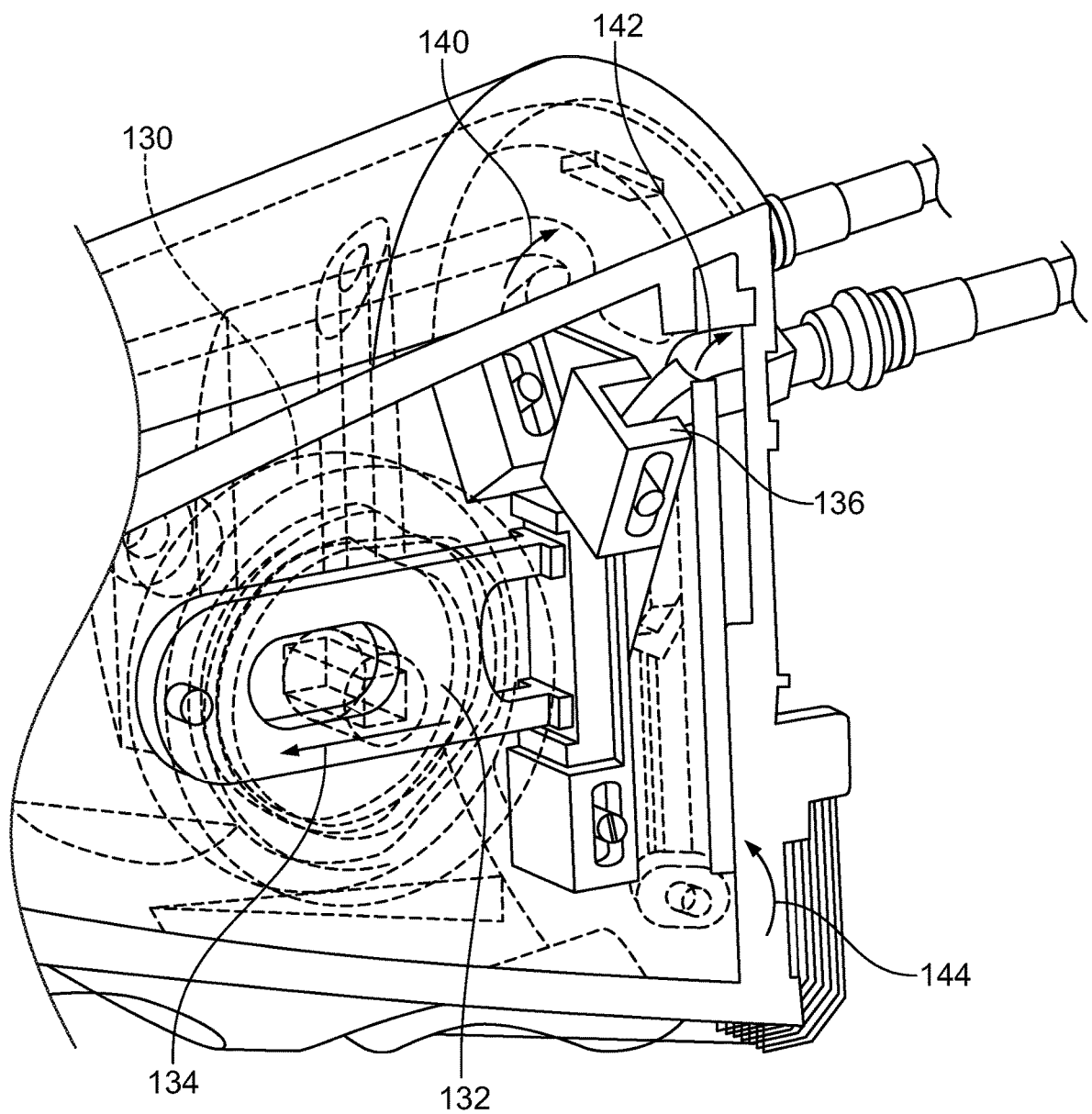
FIG. 19 is an enlarged isometric view of mechanisms, including a cam and cam follower, for moving the antennas.
Figure 21:
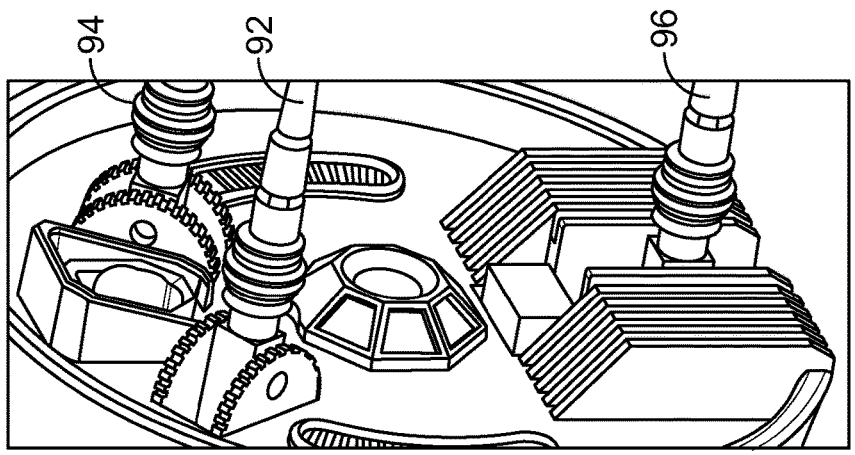
FIG. 21 is a partial isometric view of the head unit illustrating axes of rotation for the antennas.
Figure 20:
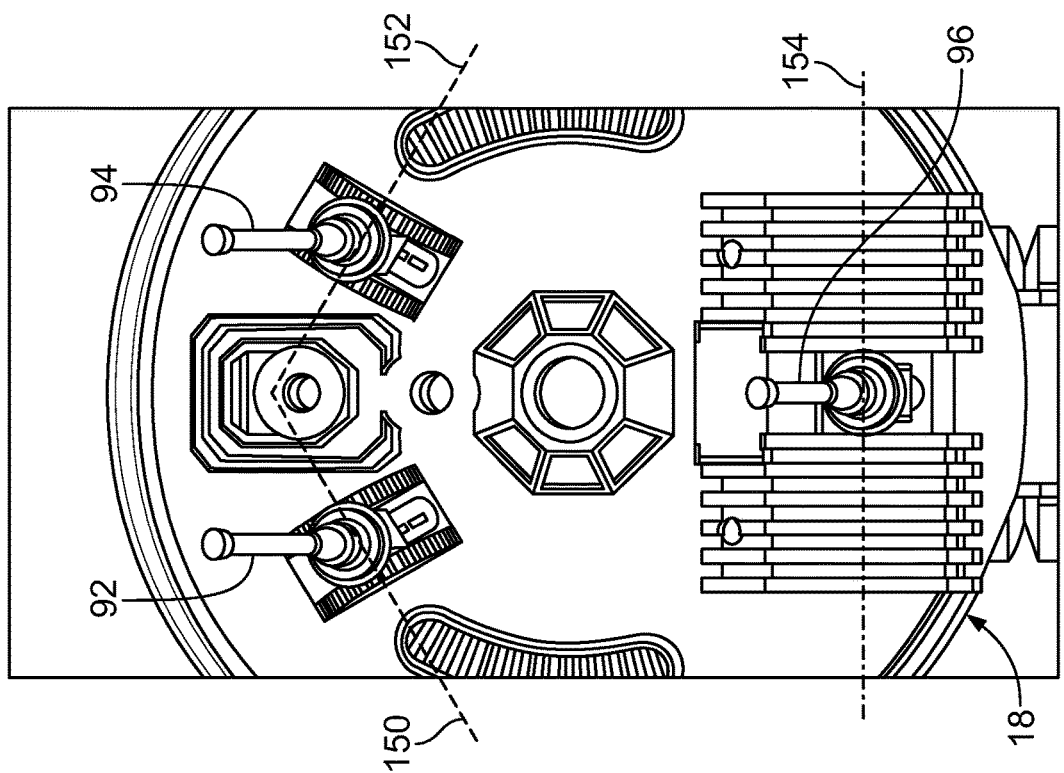
FIG. 20 is a partial rear elevation view of the head unit illustrating axes of rotation for the antennas.
Figure 22:
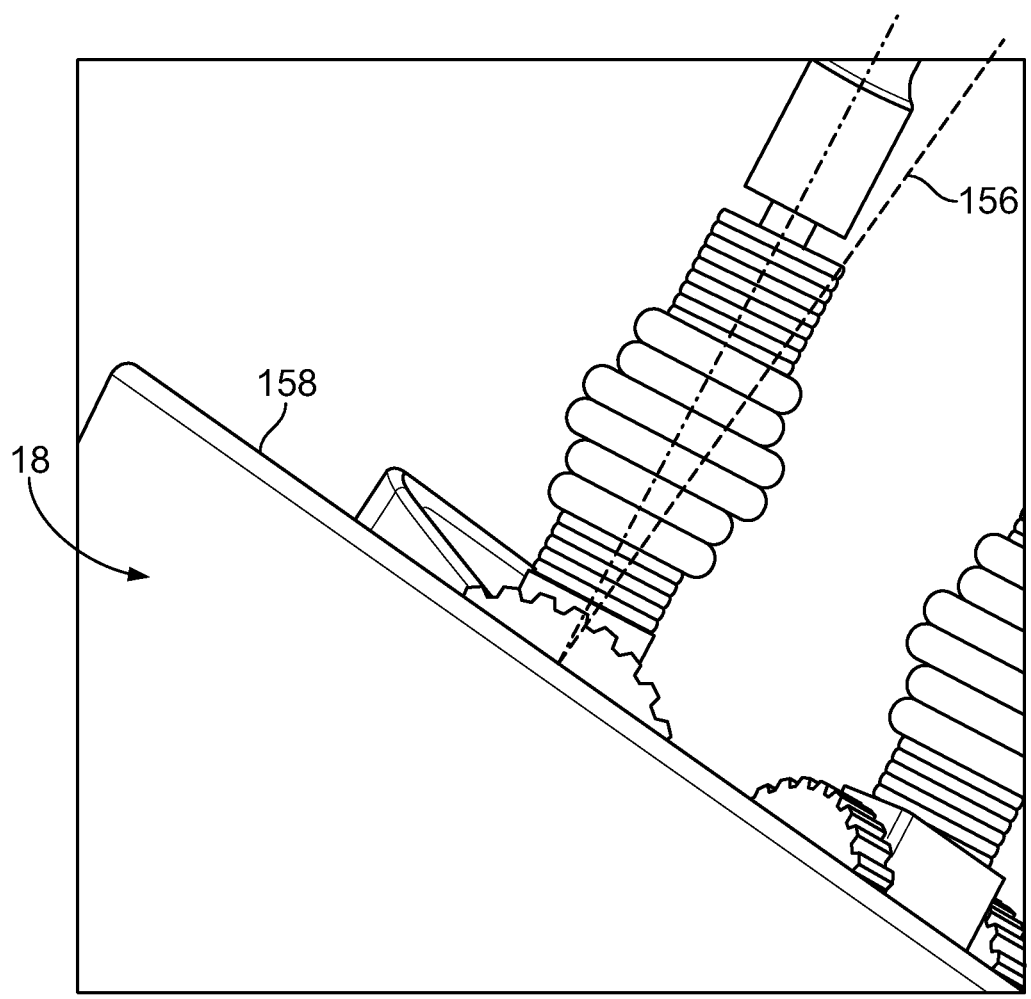
FIG. 22 is an enlarged partial side elevation view of an antenna in relation to a rear face of the head unit.

Referring now to FIGS. 15-18, there is illustrated the positions that the antennas 92, 94, 96 may take relative to the head unit 18 to help simulate emotions or emotive features. The antennas may be movable between a pinched position illustrated in FIG. 15, and a flared or spread position illustrated in FIGS. 17 and 18, with a neutral position illustrated in FIG. 16. The flared position may have the antennas about 17°-20° from the longitudinal axis 44 of the head unit 18 or a spread of about 34°-40°. The pitch and antenna mechanism is shown in more detail in FIG. 19. When the pitch/yaw motor 174 causes an antenna cam 130 to rotate, an antenna cam follower 132 moves to the left as depicted by an arrow 134 causing an antenna link 136 to rotate the antennas as illustrated by arrows 140, 142, 144. Referring to FIGS. 20 and 21, the antenna 92 may rotate about an axis 150, the antenna 94 may rotate about an axis 152 and the antenna 96 may rotate about an axis 154. As depicted, the axes 150 and 152 may be disposed about 30° from a horizontal reference. As shown in FIG. 22, in the neutral position the antennas are offset about 7° from a line 156 perpendicular to a rear face 158 of the head unit 18.

As mentioned above, there are three motors and other positioning and guidance mechanisms in the self-balancing toy vehicle platform 10 to provide enhance play value. The single wheel toy vehicle 10 is disposed with at least one appendage or movable head unit, the stand, the three motors and the wheel rims disclosed herein above. The drive or first motor 176, FIG. 23, may be located in the wheel 12 and is used to keep the toy vehicle upright and to drive the toy vehicle forward and backward. The steering or roll third motor 174 may be located in the head unit 18 for rolling the head unit. The pitch/yaw/antenna second motor 172 may be located on the stand 16 for controlling pitch, yaw and the antennas to provide emotive features. The control system 177 may be located in the wheel 12 for balancing, and an emotive control 179 may be located on the stand 16. A user may manipulate the controls with a smart phone 199 or some other remote device.

In the alternative, the motors and controls may be located in or on other hardware and in or about other positions about the toy vehicle platform.

Simulated eyes 180, 182, 184 FIG. 2, may be located in the head unit 18 by use of light piped LEDs. Although the light eyes may seem like separate LEDs, each eye may be created by forming a dimple on one or more long light bars.

Figure 25:
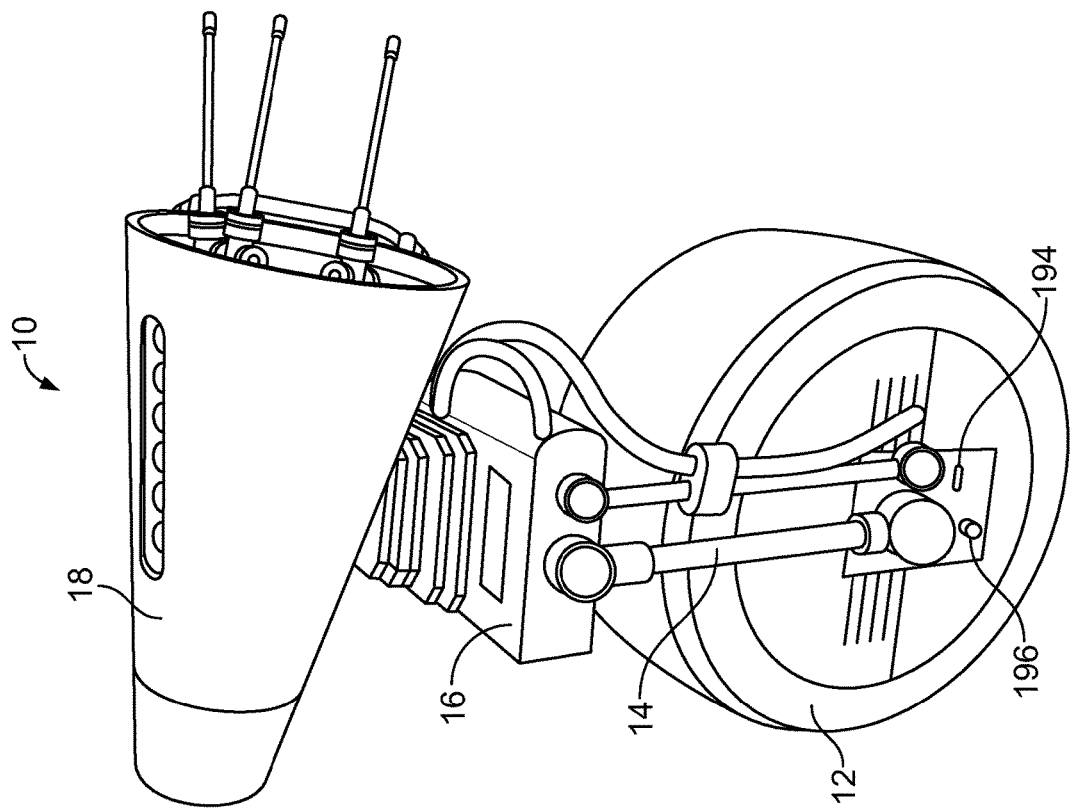
FIG. 25 is an isometric view of the toy vehicle before docking.
Figure 24:
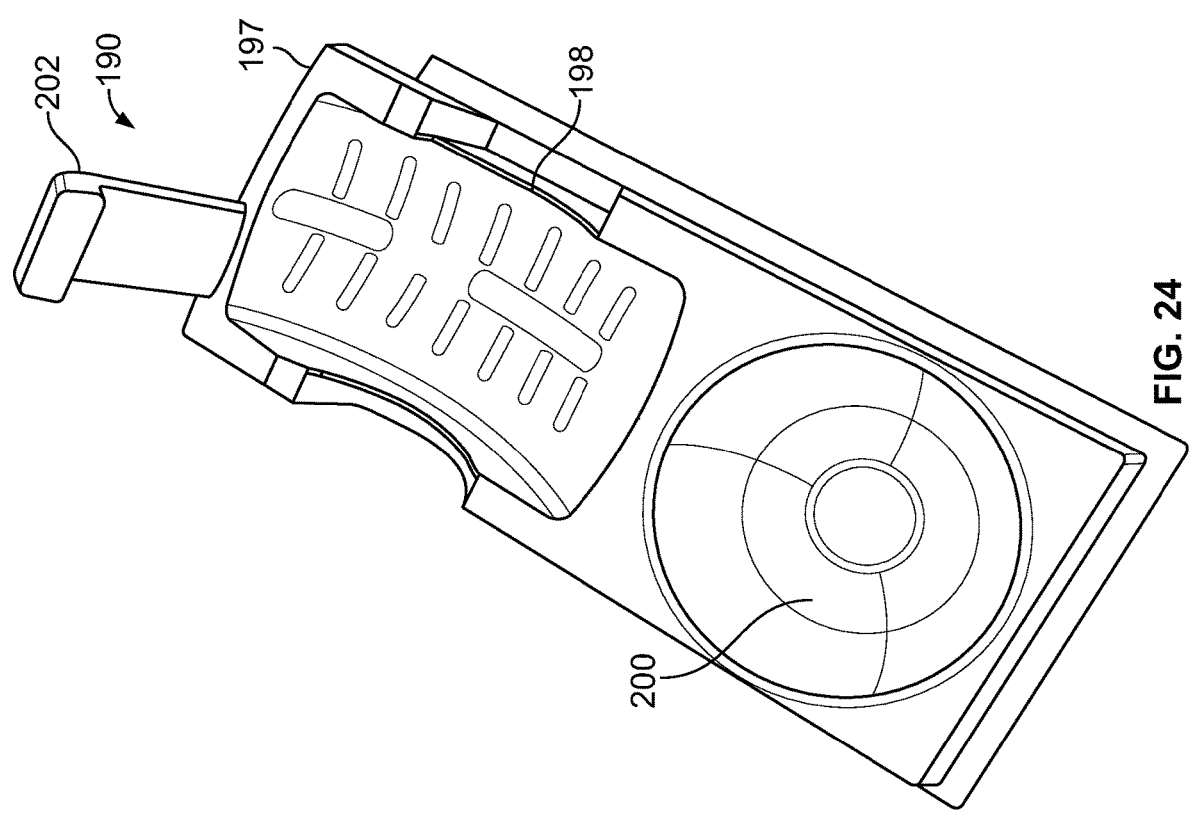
FIG. 24 is an isometric view of a docking base for the toy vehicle.
Figure 26:
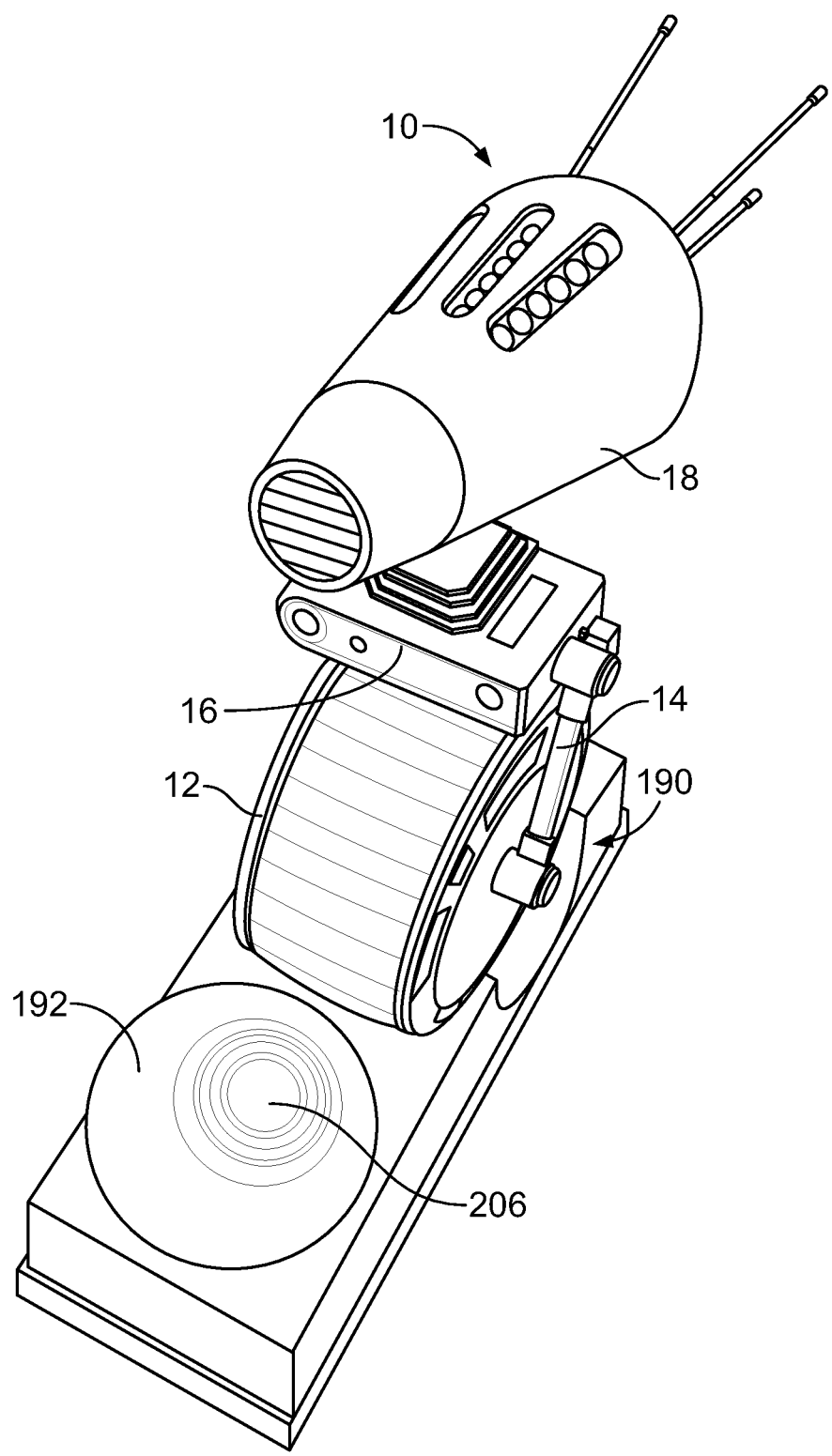
FIG. 26 is an isometric view of the base with a docked toy vehicle and a controller ball.

The present invention also may also include a vehicle dock, stand or base 190, FIGS. 24-26, for the toy vehicle 10 and a remote-control IR beacon or controller ball or ball controller 192. The controller ball and/or an app on a smart device may be used to control the toy vehicle. As illustrated in FIG. 26, the toy vehicle 10 includes a USB port 194 and a push button switch 196 to activate all dock or desk play modes. The base 190, FIG. 24, includes an outer housing 197 and a raised ridge 198, the raised ridge 198 situated to engage the switch 196 on the toy vehicle 10. The ridge 198 allows the toy vehicle to recognize the base regardless of the angular attitude of the toy vehicle. For example, the toy is 'aware' that it is in the docking base whether the head unit is upright or when the nose housing is resting on a support surface.

The base also includes a recess 200 to receive the controller ball 192. In FIG. 26, the toy vehicle 10 and the controller ball 192 are illustrated in a docked configuration on the base 190 with the frame 14 approximately vertical and in an approximate 45° 'awake' zone (about 22.5° to each side of the vertical frame).

Figure 27:
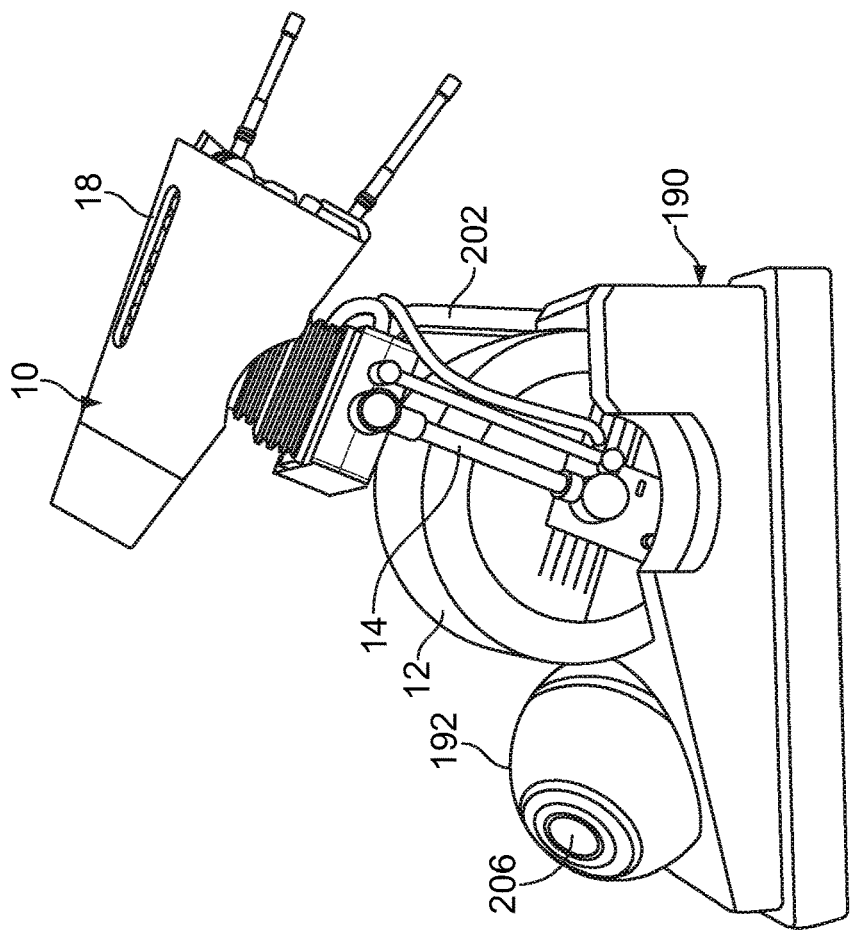
FIG. 27 is a side elevation view of the docked toy vehicle during battery charging.

Referring to FIG. 27, the toy vehicle 10 is positioned in a 60° to 70° rightward or rearward slant against a charging post 202 of the base 190 causing the toy vehicle to assume a 'sleep' mode. Viewing FIG. 28, the toy vehicle 10 is shown rotated to the left or forward so as to be in a 'play' mode. The play mode may have the frame 14 positioned about 70° from a vertical reference. When the vehicle is in the base, the wheel 12 is fixed such that when the drive motor 176 operates, the wheel and frame move, causing the receptacle 16 and head unit 18 to move. Without the need for active inverted pendulum control, the drive motor may be used for emotive purposes, and the head unit may be allowed to bow. With the toy docked in the base, the roll motor 172 is no longer needed for lateral stability and it too may be used for emoting.

The play value of the toy vehicle platform is considerable. For example, the toy vehicle may be considered a droid or robot with a puppy-like personality. This personality may be playful, curious and eager for affection with a naïve fearlessness and cute clumsiness. The 'puppy' toy may bond with a user and may follow the user around like a young duckling following along after its mother.

Figure 30:
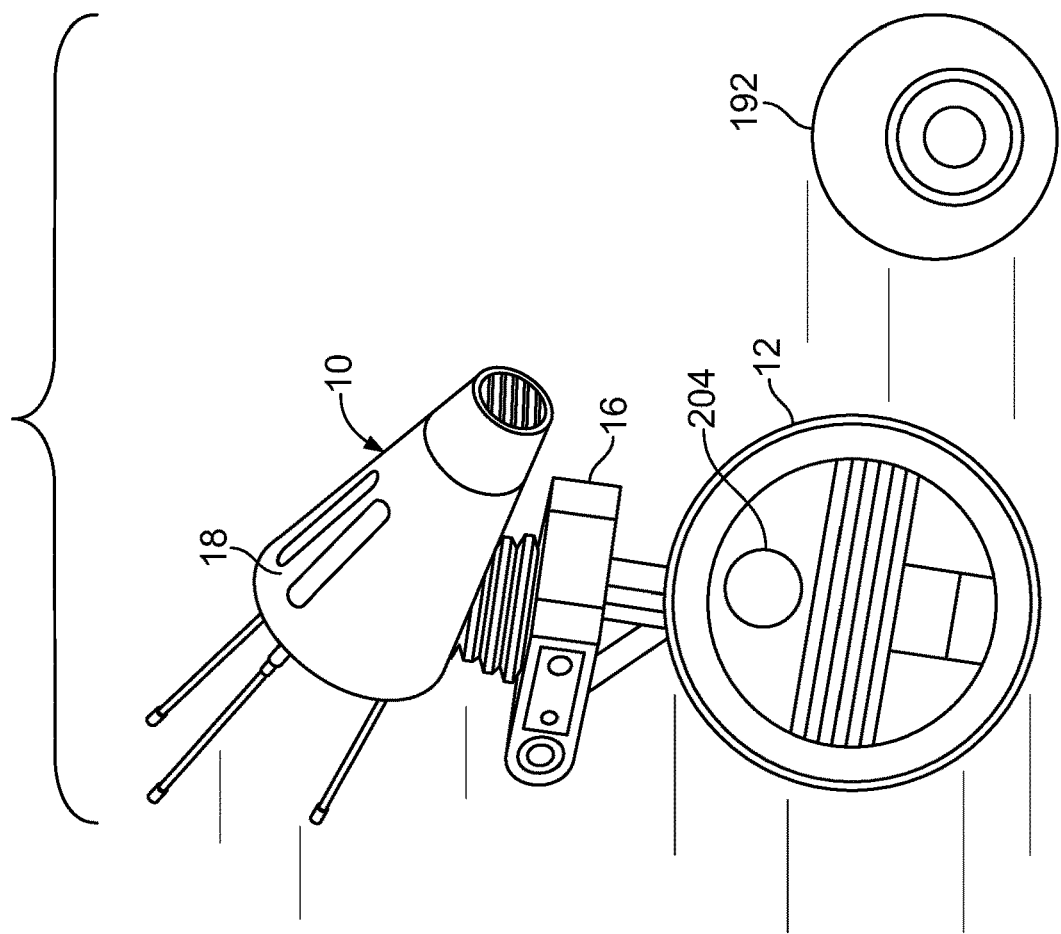
FIG. 30 is an isometric view of the toy vehicle chasing the controller ball.

To achieve a desired play value the toy vehicle 10 may have the following hardware: three IR receivers, two microphones, an accelerometer and gyro, a power button 204, FIG. 30, on the wheel, the base docking switch 196, BLE, a reset button, an optical encoder to detect wheel movement, a speaker, the three motors 172, 174, 176, three white LEDs, one IR LED and the controller ball 192 with one button, two IR LEDs and one red LED.

In standalone or desktop gameplay, the toy vehicle 10 may have a 'wake sequence' operated by the button 204 on the wheel 12 which when pressed, may turn on the vehicle's lights, make yawning sounds, slowly wake up and begin to balance, shake the head unit 18 and show itself ready to play. With the toy vehicle securely in the base, the user may press the power button 204 on the wheel to wake up the vehicle. The user may then use the controller ball 192 in front of the vehicle and press a button 206, FIGS. 26 and 27, on the controller ball to have the head unit 18 'follow' the controller ball. Another desktop game, referred to as 'guard mode,' may be initiated by pressing the button 206 on the controller ball. The docked vehicle may respond with sounds and motions.

Figure 29:
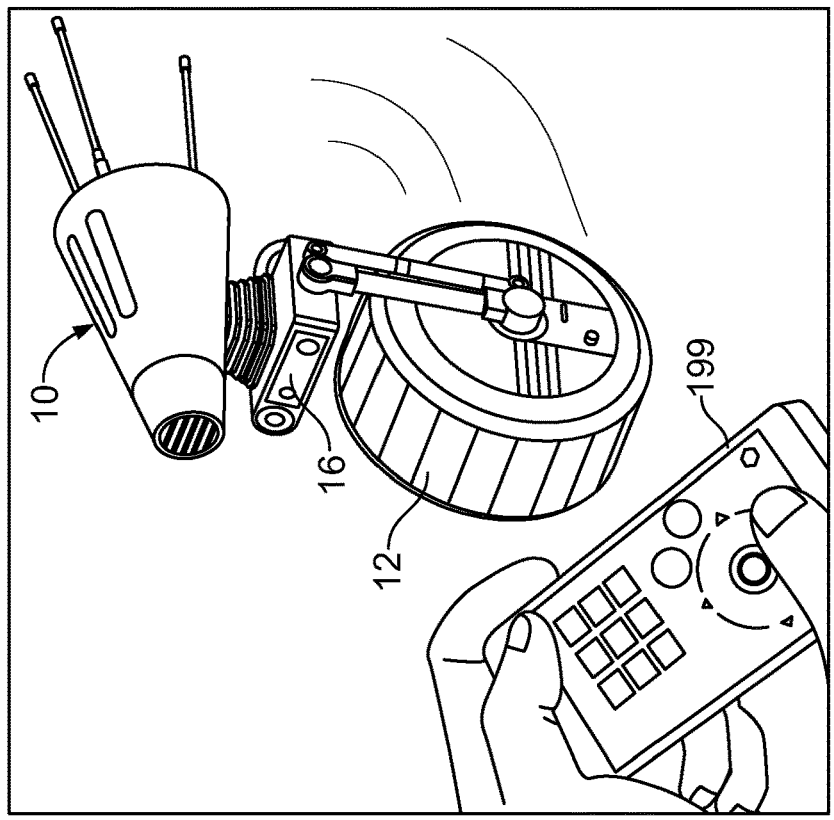
FIG. 29 is an isometric view of the toy vehicle controlled by a smart phone.
Figure 31:
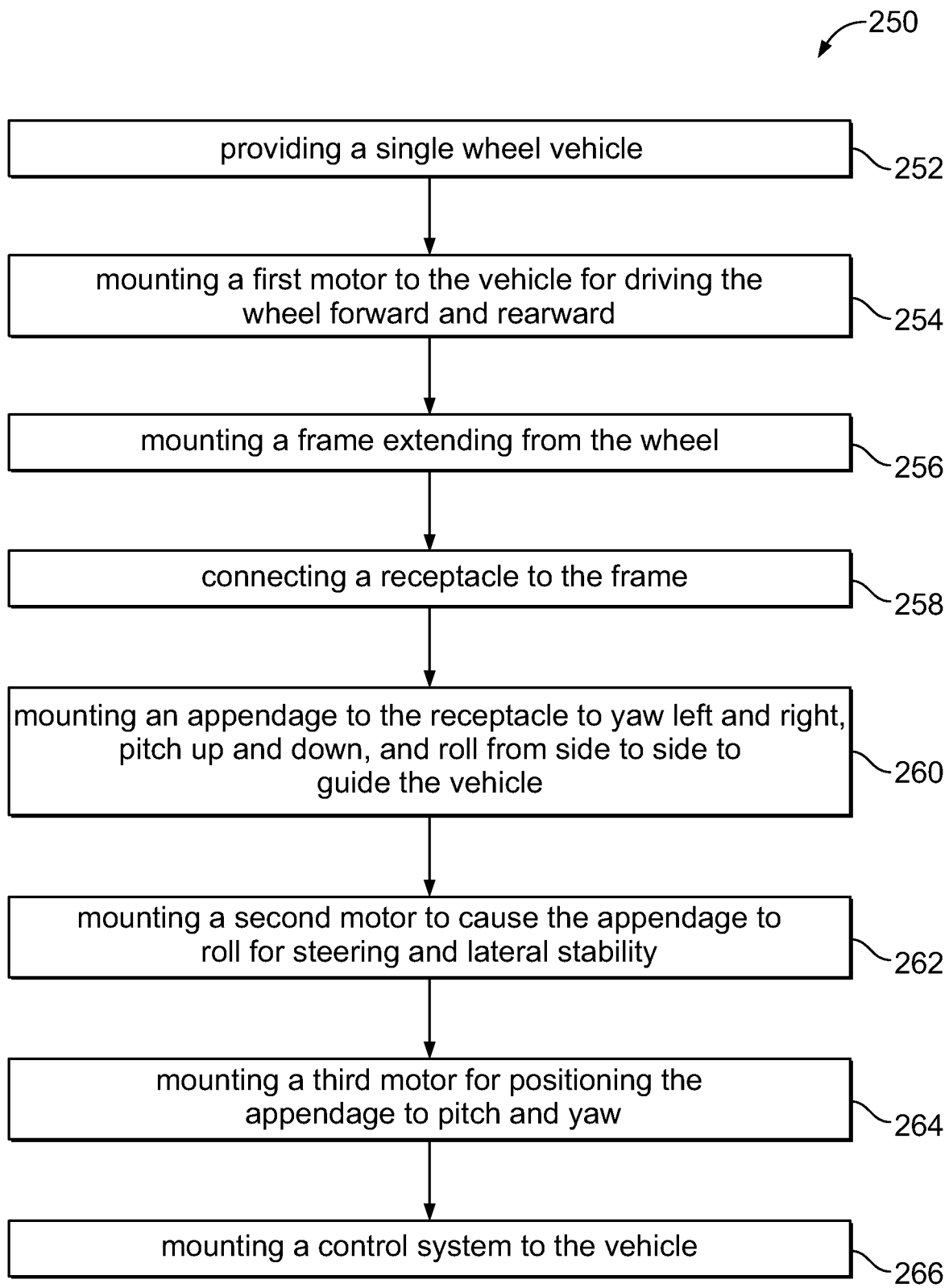
FIG. 31 is a flow diagram of a method for assembling the toy vehicle.

For floor or chase mode or play, where the vehicle is removed from the base, as depicted generally in FIG. 29, a smart phone 199 may be used to control the toy vehicle. If the toy wakes while being held, it may react with an excited or happy sequence. After waking, the toy may enter a 'hangout mode' where the toy may be self-balancing so as to remain upright and in-place on the floor. Should the toy vehicle wake on its side, the toy may play a nervous or confused sequence and attempt to move the head unit looking for help. When handling the toy vehicle it is recommended that the user hold the toy vehicle by the cantilevered receptacle 16 and the upper portion of the frame 14.

If no input is received by the toy for a preselected time it may play an 'idle' sequence, any of a variety of expressions and movement, such as humming, looking around and exploring. If no input is received the toy may go through a 'play-with-me' sequence, which involve motioning to be played with and giving off eager or whining sounds. When exploring, the toy may detect obstacles and walls, react to them curiously, stop, back up, and go around. Also in floor-play mode, the user may place the toy vehicle on a floor and press the controller ball button 206 to cause the vehicle to 'chase' the ball controller as depicted in FIG. 30.

The toy vehicle 10 may be able to play tricks and games with props, make noise, play dodge ball with the controller ball 192, kick the ball, mimic actions previously done, peck at a user's hand, play goalie, play dead, nurture and cuddle, and match the sequence of lights in the head unit with the light in the ball. The toy vehicle may fall over and make a startled sound and/or a pleading or whining sound, or laugh sheepishly. The accelerometer will allow the toy vehicle to detect when it has fallen and may follow with a startled sound. When the toy bumps into an object the toy may issue a startled sound and back away, or the toy may back up and perform a bark like a guard dog. When the user shakes the toy, the toy may respond with a modulating, repetitive sound like 'whoa-whoa-whoa-whoa' and then act dizzy when placed down. When the toy is picked up it may make short positive sounds to indicate that it likes to be held. If turned upside down the toy may issue a scared reaction or a 'weeeee-like' sound. If poked or pushed the toy may issue a short surprised, annoyed, or excited sound. And if the toy is picked up and moved like an airplane, the toy may make sounds like a Star War's X-wing fighter.

Games with the ball accessory 192 include the toy vehicle 10 moving toward or chasing the ball when a user depresses the ball button. This simulates heeling, like having a dog staying a short distance behind a walking owner. When the ball button is pressed once the red LED may flash for a predetermined time such that when the user rolls the ball in front of the toy vehicle, the toy vehicle may become excited and eagerly try to chase the ball and may try to kick the ball by running into it. If the user presses the ball button multiple times, the toy vehicle may play a warning alarm, flash its LEDs and drive forward and backward while 'looking around' as if on high alert.

Figure 28:
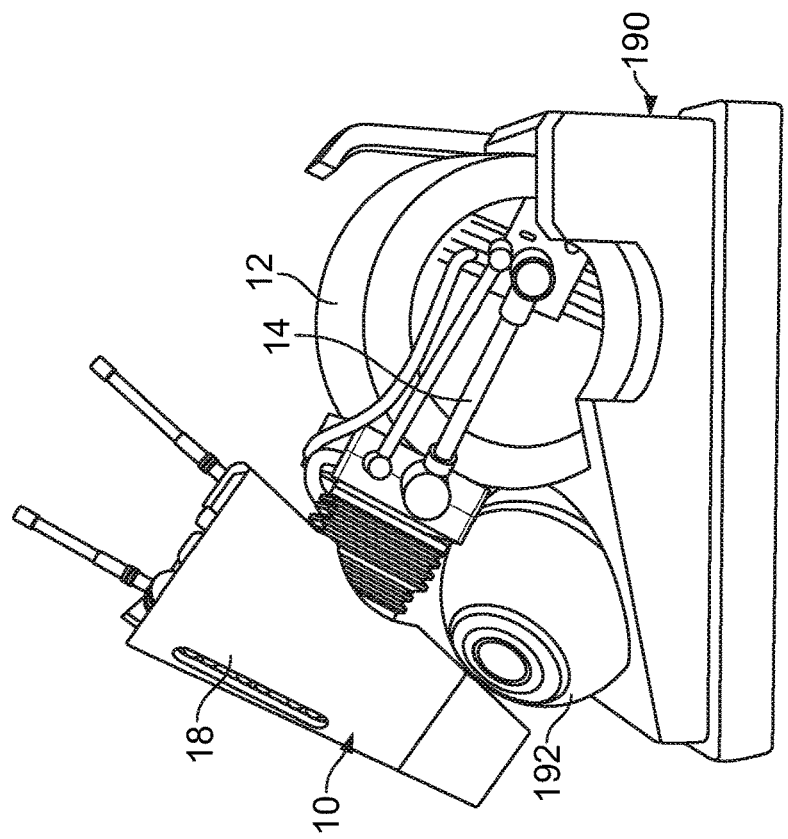
FIG. 28 is a side isometric view of the docked toy vehicle doing a bow during play mode.

When the battery runs low and the toy is placed in the docking base 190, the toy may play a powering down sound and perform predetermine movements. The toy may sleep after a predetermined time of no input or when the user depresses the vehicle's button. The head unit may also be allowed to bow as shown in FIG. 28. The toy may enter gameplay when it is put in the docking base by playing a chime. The same or different chimes may play when the toy is removed from the docking base. The toy may wake when the wheel button 204 is depressed, the waking sequence including the lights going on, emitting yawning sounds and shaking the head unit. Pressing the wheel button may initiate a tickled or excited response from the toy. The toy may respond when it detects speech by turning the head unit toward the sound and making a babbling sound. If the sound is sharp, the toy may play a startled sequence like a barking sound. The toy may also respond to music with dancing movements.

When the toy is docked on the base, the toy may react by playing a disoriented sound like it is unsteady and trying to balance. If the ball button 206 is depressed once, the toy may turn the head unit to the ball, and if the ball moves across the toy, the head unit may try to track the ball by turning to follow it. When in a 'guard' mode, if the toy hears a sound or detects movement the toy may shriek and make rapid motions. An app on the smart phone 199 may interact with the toy by sending BLE signals that call up specific animation sequences, some combination of motion, light and audio. The toy may respond based on app gameplay scenarios. To support gameplay, a content library may be available including one to two hundred audio sequences with animations and light displays, reaction types and motions to support radio control by a user.

It is noted that throughout this detailed description, words such as "front" and "rear," "forward" and "rearward," and "up" and "down," as well as similar positional or locational terms, refer to portions or elements of the toy apparatus as they are viewed in the drawings relative to other portions, or in relationship to the positions of the apparatus as it will typically be held and moved during play by a user, or to movements of elements based on the configurations illustrated.

The present invention also includes a method 250 for assembling a toy vehicle with positioning and guiding mechanisms including providing a single wheel vehicle 252, mounting a first motor to the vehicle for driving the wheel forward and rearward 254, mounting a frame extending from the wheel 256, connecting a receptacle to the frame 258, mounting an appendage to the receptacle to yaw left and right, pitch up and down, and roll side to side to guide the vehicle 260, mounting a second motor to the vehicle to cause the appendage to roll for steering and lateral stability 262, mounting a third motor to the vehicle for positioning the appendage to pitch and yaw 264, and mounting a control system to the vehicle 266.

The toy vehicle disclosed in detail above has great play value, is fun to use and easy to operate, and is safe, even for young children. The toy vehicle is robust, with relatively simple structures, and may be produced at reasonable cost.

From the foregoing, it can be seen that there has been provided features for an improved toy vehicle and a disclosure of a method for making the toy vehicle. While a particular embodiment and variations of the present invention have been shown and/or described in great detail, it will be obvious to those skilled in the art that changes and modifications may be made without departing from the invention in its broader aspects. Therefore, the aim is to cover all such changes and modifications as fall within the true spirit and scope of the invention. The matters set forth in the foregoing description and accompanying drawings are offered by way of illustrations only and not as limitations. The actual scope of the invention is to be defined by any subsequent claims.

What is claimed is:

1. A vehicle platform with positioning and guiding mechanisms, comprising:
   a vehicle having a single wheel, the wheel including left and right rims of a smaller diameter than the diameter of the wheel;
   a frame extending from the wheel;
   a receptacle mounted to the frame;
   a movable appendage mounted to the receptacle;
   first, second, and third motors connected to the vehicle for driving the wheel forward and rearward, and for rolling, pitching and yawing the appendage; and
   a control system for controlling the first, second and third motors.

2. The vehicle platform of claim 1, wherein:
   the appendage comprises a head unit.

3. The vehicle platform of claim 2, wherein:
   the control system is located in the single wheel of the vehicle and comprises a multi-axis inertial measurement unit and proportional integral derivation control loop to maintain the head unit and move the vehicle forward, with an angle of the head unit being shifted forward of a vertical reference; and
   the one of the motors positions the head unit to roll for steering and lateral stability.

4. The vehicle platform of claim 3, wherein:
   the center of gravity of the head unit is over an edge of the wheel and is maintained with the one of the motors for steering control thereby wherein the head unit steers the single wheel vehicle with the control system.

5. The vehicle platform of claim 4, further comprises:
   a docking base for the vehicle, and upon being in the base where the wheel is fixed therein, the one of the other motors is used for emotive purposes; and
   the one of the motors used for positioning the head unit to roll for steering and lateral stability is no longer needed for control of the single wheeled vehicle with the control system while docked in the base.

6. The vehicle platform of claim 1, wherein:
   the appendage comprises one or more antennas to provide emotive features therewith.

7. The vehicle platform of claim 1, wherein:
   the control system further comprises a remote control (RC) controller for causing the single wheel vehicle to move.

8. The vehicle platform of claim 1, further comprises:
   a docking base for the vehicle; and wherein
   when the vehicle is in the base, the wheel is fixed therein.

9. The vehicle platform of claim 8, wherein;
   the wheel and frame move causing the receptacle and appendage to move without the need for active control by the control system.

10. The vehicle platform of claim 9, wherein:
    the first motor may be used for emotive purposes and allows the head unit to bow to simulate heeling when the vehicle is docked in the base.

11. A vehicle platform with positioning and guiding mechanisms, comprising:
    a single wheel vehicle including left and right rims having smaller diameters than the diameter of the wheel for limiting lean of the wheel;
    a first motor connected to the vehicle for driving the wheel forward and rearward;

a frame extending from the vehicle;

a receptacle connected to the frame;

a head unit mounted to the receptacle to yaw left and right, to pitch up and down, and to roll from side to side to guide the vehicle;

a second motor connected to the vehicle for positioning the head unit to roll;

a third motor connected to the vehicle for positioning the head unit to pitch and yaw; and a control system for controlling the first, second and third motors, wherein the control system is located in the single wheel of the vehicle and comprises a multi-axis inertial measurement unit and proportional integral derivation control loop to maintain the head unit and move the vehicle forward, with an angle of the head unit being shifted forward of a vertical reference, and the second motor for positioning the head unit to roll for steering and lateral stability.

12. The vehicle platform of claim 11, wherein:

the center of gravity of the head unit over an edge of the wheel is maintained with the second motor for steering control thereby the head unit steers the single wheel vehicle with the control system.

13. The vehicle platform of claim 12, further comprises:

a docking base for the vehicle, and upon being in the base the wheel is fixed therein; and wherein the second motor is used for emotive purposes; and the second motor for positioning the head unit to roll for steering and lateral stability is no longer needed for control of the single wheeled vehicle with the control system while the vehicle is docked in the base.

14. The vehicle platform of claim 12, further comprises:

a docking base for the vehicle, and upon being placed in the base the wheel is fixed therein; and wherein the wheel and frame are allowed to move causing the receptacle and head unit to move without the need for active control by the control system.

15. The vehicle platform of claim 14, wherein:

the first motor may be used for emotive purposes and allows the head unit to bow to simulate heeling when the vehicle is docked in the base.

16. A method for assembling a toy vehicle platform having positioning and guiding mechanisms, comprising the steps of:

providing a single wheel vehicle;

mounting a first motor to the vehicle for driving the wheel forward and rearward;

mounting a frame extending from the wheel;

connecting a receptacle to the frame;

mounting an appendage to the receptacle to yaw left and right, pitch up and down, and roll from side to side to guide the vehicle;

mounting a second motor to the vehicle to cause the appendage to roll for steering and lateral stability;

mounting a third motor to the vehicle for positioning the appendage to pitch and yaw; and mounting a control system to the vehicle.

17. The method for assembling the vehicle platform of claim 16, comprising the step of:

positioning the appendage to pitch and yaw in response to the third motor wherein the appendage comprises a head unit for emotive actions in response to the third motor.

18. The method for assembling the vehicle platform of claim 17, comprising the step of:

providing a pair of left and right rims adjacent to the wheel for limiting lean of the vehicle, and wherein the control system controls the first, second and third motors.

19. The method for assembling the vehicle platform of claim 18, further comprises the step of:

providing a docking base for the vehicle, wherein upon the vehicle being mounted in the base, the wheel is fixed therein allowing the wheel and frame to move causing the receptacle and head unit to move without the need for active control by the control system.

20. The method for positioning and guiding of vehicle platform with mechanisms of claim 19, wherein:

the first motor may be used for emotive purposes and allows the head unit to bow to simulate heeling when the vehicle is docked in the base.

* * * * *